(12) United States Patent
Pett et al.

(10) Patent No.: US 9,896,557 B2
(45) Date of Patent: Feb. 20, 2018

(54) SILICONE-BASED MATERIAL

(75) Inventors: Todd G. Pett, Minneapolis, MN (US); Timothy J. Hebrink, Scandia, MN (US); Naiyong Jing, Woodbury, MN (US); Justin A. Riddle, St. Paul, MN (US); David Scott Thompson, West Lakeland, MN (US); Andrew K. Hartzell, Hudson, WI (US); Junkang J. Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 923 days.

(21) Appl. No.: 13/642,355

(22) PCT Filed: Apr. 20, 2011

(86) PCT No.: PCT/US2011/033273
§ 371 (c)(1),
(2), (4) Date: Oct. 19, 2012

(87) PCT Pub. No.: WO2011/139573
PCT Pub. Date: Nov. 10, 2011

(65) Prior Publication Data
US 2013/0040073 A1    Feb. 14, 2013

Related U.S. Application Data

(60) Provisional application No. 61/390,496, filed on Oct. 6, 2010, provisional application No. 61/328,943, filed on Apr. 28, 2010.

(51) Int. Cl.
*B05D 3/06* (2006.01)
*C08J 7/12* (2006.01)
(Continued)

(52) U.S. Cl.
CPC .............. *C08J 7/123* (2013.01); *B05D 3/068* (2013.01); *C09D 5/006* (2013.01); *C09D 183/04* (2013.01);
(Continued)

(58) Field of Classification Search
CPC . F28D 15/0241; F28F 3/02; F28F 3/04; F28F 3/022; C08J 2383/04; C08J 7/123;
(Continued)

(56) References Cited

U.S. PATENT DOCUMENTS 3,301,741 A    1/1967    Henrickson
3,354,022 A    11/1967    Dettre
(Continued)

FOREIGN PATENT DOCUMENTS

EP    0145308    6/1985
EP    0 233 752    8/1987
(Continued)

OTHER PUBLICATIONS

Bragg, "The Form Birefringence of Macromolecules", Acta. Cryst., 1953, vol. 6, pp. 865-867.
(Continued)

*Primary Examiner* — Dah-Wei D. Yuan
*Assistant Examiner* — Jose Hernandez-Diaz
(74) *Attorney, Agent, or Firm* — Adrian L. Pishko; Gregory D. Allen

(57) ABSTRACT

Surface-structured, cross-linked silicone-based material and method for making the same. Embodiments of silicone-based materials described herein are useful, for example, in applications of light capture, anti-reflection, light redirection, light diffusion, hydrophobic surfaces, hydrophilic surfaces, light guiding, light collimation, light concentration,
(Continued)

Fresnel lens, retro-reflection, drag reduction, air bleed adhesives, release liner, abrasion resistance, and anti-fouling.

20 Claims, 4 Drawing Sheets

(51) Int. Cl.
  *C09D 5/00* (2006.01)
  *C09D 183/04* (2006.01)
  *G02B 1/118* (2015.01)
  *C08L 83/04* (2006.01)
(52) U.S. Cl.
  CPC ........... *G02B 1/118* (2013.01); *C08J 2383/04* (2013.01); *C08L 83/04* (2013.01)
(58) Field of Classification Search
  CPC ..... C09L 83/04; G02B 1/118; B05D 2518/10; B05D 18/10
  USPC .......................................... 427/596; 522/148
  See application file for complete search history.

(56) References Cited

U.S. PATENT DOCUMENTS

| | | | |
|---|---|---|---|
| 3,931,428 A | 1/1976 | Reick | |
| 4,590,117 A | 5/1986 | Taniguchi | |
| 4,683,160 A | 7/1987 | Bloch | |
| 4,916,169 A | 4/1990 | Boardman | |
| 4,944,514 A | 7/1990 | Suiter | |
| 4,986,496 A | 1/1991 | Marentic | |
| 5,069,403 A | 12/1991 | Marentic | |
| 5,073,404 A | 12/1991 | Huang | |
| 5,133,516 A | 7/1992 | Marentic | |
| 5,145,886 A | 9/1992 | Oxman | |
| 5,175,030 A | 12/1992 | Lu | |
| 5,217,805 A | 6/1993 | Kessel | |
| 5,221,497 A | 6/1993 | Watanabe | |
| 5,378,535 A | 1/1995 | Moncur | |
| 5,435,816 A | 7/1995 | Spurgeon | |
| 5,480,596 A * | 1/1996 | Okubo et al. ............. 264/1.33 | |
| 5,654,093 A | 8/1997 | Kidon | |
| 5,667,595 A | 9/1997 | Vaverka | |
| 5,858,468 A | 1/1999 | Byrd | |
| 5,972,809 A | 10/1999 | Faler | |
| 6,040,053 A | 3/2000 | Scholz | |
| 6,046,250 A | 4/2000 | Boardman | |
| 6,117,555 A | 9/2000 | Fujimori | |
| 6,132,861 A | 10/2000 | Kang | |
| 6,180,181 B1 | 1/2001 | Verardi | |
| 6,244,740 B1 | 6/2001 | Wagner | |
| 6,251,523 B1 | 6/2001 | Takahashi | |
| 6,376,569 B1 | 4/2002 | Oxman | |
| 6,391,141 B2 | 5/2002 | Boaz | |
| 6,480,596 B1 | 11/2002 | Min | |
| 6,495,624 B1 | 12/2002 | Brown | |
| 6,511,701 B1 | 1/2003 | Divigalpitiya | |
| 6,573,328 B2 | 6/2003 | Kropp | |
| 6,730,397 B2 | 5/2004 | Melancon | |
| 6,783,349 B2 | 8/2004 | Neavin | |
| 6,800,354 B2 | 10/2004 | Baumann | |
| 6,926,952 B1 | 8/2005 | Weber | |
| 6,929,849 B2 | 8/2005 | Koskenmaki | |
| 7,070,850 B2 | 7/2006 | Dietz | |
| 7,074,463 B2 | 7/2006 | Jones | |
| 7,215,473 B2 | 5/2007 | Fleming | |
| 7,368,655 B2 | 5/2008 | Blieske | |
| 7,486,019 B2 | 2/2009 | Padiyath | |
| 7,575,655 B2 | 8/2009 | Kuhn | |
| 2001/0051213 A1 | 12/2001 | Schulz | |
| 2002/0045045 A1 | 4/2002 | Adams | |
| 2002/0129850 A1 | 9/2002 | Nomura | |
| 2003/0013795 A1 | 1/2003 | Nun | |
| 2003/0094265 A1* | 5/2003 | Chu ........................ F28F 3/022 165/133 | |
| 2004/0068035 A1 | 4/2004 | Paiva | |
| 2004/0118579 A1* | 6/2004 | McCutcheon ...... F28D 15/0241 174/16.3 | |
| 2005/0178428 A1 | 8/2005 | Laaly | |
| 2005/0223945 A1 | 10/2005 | Baumgart | |
| 2006/0062937 A1 | 3/2006 | Padiyath | |
| 2006/0204655 A1 | 9/2006 | Takahashi | |
| 2006/0225776 A1 | 10/2006 | Nemazi | |
| 2006/0234605 A1 | 10/2006 | Bryan | |
| 2007/0257400 A1 | 11/2007 | Stenzel | |
| 2007/0292623 A1 | 12/2007 | Lin | |
| 2008/0135091 A1 | 6/2008 | Cheng | |
| 2009/0061039 A1* | 3/2009 | Zhang et al. ............. 425/436 R | |
| 2009/0117310 A1 | 5/2009 | Ellringmann | |
| 2009/0283133 A1 | 11/2009 | Hebrink | |
| 2009/0283144 A1 | 11/2009 | Hebrink | |
| 2010/0051093 A1 | 3/2010 | Harder | |
| 2010/0173167 A1 | 7/2010 | Vissing | |
| 2010/0180928 A1 | 7/2010 | Raymond | |
| 2010/0266836 A1 | 10/2010 | Campazzi | |
| 2011/0033694 A1 | 2/2011 | Jing | |
| 2011/0151168 A1* | 6/2011 | Meyer .................... B32B 27/32 428/41.3 | |
| 2011/0157704 A1 | 6/2011 | Sato | |
| 2011/0206923 A1* | 8/2011 | Liu ............................ C08J 3/28 428/317.3 | |
| 2011/0206924 A1* | 8/2011 | Liu et al. ................... 428/317.7 | |
| 2011/0223434 A1 | 9/2011 | Roehrig | |
| 2012/0018482 A1 | 1/2012 | Pepin | |
| 2012/0199198 A1 | 8/2012 | Hebrink | |
| 2012/0276369 A1 | 11/2012 | Jing | |
| 2013/0010364 A1 | 1/2013 | Hebrink | |
| 2013/0040126 A1 | 2/2013 | Pett | |

FOREIGN PATENT DOCUMENTS

| | | |
|---|---|---|
| EP | 0263428 | 4/1988 |
| EP | 0424006 | 4/1991 |
| EP | 0570165 | 11/1993 |
| EP | 0834468 | 4/1998 |
| EP | 1132448 | 9/2001 |
| EP | 1362682 | 11/2003 |
| EP | 1486802 | 12/2004 |
| EP | 1690602 | 8/2006 |
| EP | 1 746 123 | 1/2007 |
| EP | 2 062 952 | 5/2009 |
| GB | 1454960 | 11/1976 |
| GB | 2041956 | 9/1980 |
| GB | 2066565 | 7/1981 |
| GB | 2137648 | 10/1984 |
| JP | 05163463 | 6/1993 |
| JP | 2003-119434 | 4/2003 |
| WO | 1990/15673 | 12/1990 |
| WO | 1997/31357 | 8/1997 |
| WO | 2001/68940 | 9/2001 |
| WO | 2003/033423 | 4/2003 |
| WO | 2007/015273 | 2/2007 |
| WO | 2008/022027 | 2/2008 |
| WO | 2009/029435 | 3/2009 |
| WO | 2009/046725 | 4/2009 |
| WO | 2009/141830 | 11/2009 |
| WO | WO 2009/145049 | 12/2009 |
| WO | 2010/017069 | 2/2010 |
| WO | 2010/056541 | 5/2010 |
| WO | 2010/056543 | 5/2010 |
| WO | 2010/056546 | 5/2010 |
| WO | 2011/056496 | 5/2011 |
| WO | 2011/081974 | 7/2011 |
| WO | 2012/047422 | 4/2012 |
| WO | 2012/047749 | 4/2012 |

OTHER PUBLICATIONS

Brook, *Silicon in Organic, Organometallic, and Polymer Chemistry*, Chapter 9.6.3: Oxidative Degradation, 2nd paragraph, John Wiley & Sons, Inc., p. 297, (2000).

(56) References Cited

OTHER PUBLICATIONS

Dolle, "Gradual Photochemical-Induced Conversion of Liquid Polydimethylsiloxane Layers to Carbon Containing Silica Coatings by VUV Irradiation at 172 nm", Langmuir, 2009, vol. 25, No. 12, pp. 7129-7134.

Frounchi, "Comparison Between Electron-Beam and Chemical Crosslinking of Silicone Rubber", Nuclear Instruments and Methods in Physics Research B, Feb. 2006, vol. 243, No. 2, pp. 354-358.

Mark, *Physical Properties of Polymers Handbook*, Second Edition, (2007), Springer Science + Business Media, LLC, p. 882.

Scheydecker, "Reduction of Reflection Losses of PV-Modules by Structured Surfaces", Solar Energy, Aug. 1994, vol. 53, No. 2, pp. 171-176.

Winter, "Design of Dies for the Extrusion of Sheets and Annular Parisons: The Distribution Problem", Polymer Engineering & Science, Apr. 1986, vol. 26, No. 8, pp. 543-553.

International Search Report for PCT/US2011/033273, 3 pages.

ASTM D907-15, "Standard Terminology of Adhesives," 13 pages.

\* cited by examiner

SILICONE-BASED MATERIAL

BACKGROUND

Structured surfaces have been used in various applications for optical benefits, surface energy modification, adhesive tack control, and drag reduction. For example, prismatic structures on the surface of photovoltaic panels reduce reflection and direct more light towards the silicon cells, thus increasing power output. Similar prismatic structures promote fluid flow over a surface resulting in reduced drag when applied to an automobile, boat, or the like, or to wind or water turbine blades. Structured surfaces can also be used to make hydrophilic surfaces hydrophobic.

Silicone elastomers are known for their stability under long-term ultra-violet light exposure, and they can be optically clear and tough, which makes them well suited for outdoor use. Replicated structured surfaces are commonly made out of silicones, especially using a platinum catalyzed addition cure silicone. This results in very well replicated surfaces but requires a catalyst, heating cycle and more expensive vinyl and hydride functional silicone fluids. Condensation cure silicones can be used but also require a catalyst and moisture for the reaction. The moisture is usually taken from the ambient air but during a microreplication process there is the problem of moisture diffusion since often the silicone is partially or fully covered by a tool or substrate. Therefore it can take a long time to cure. In addition, metal catalysts are expensive, are easily inactivated by contaminants, and residual catalyst in silicones can be undesirable. Peroxide cured silicones also require thermal cycles to initiate cross-linking and have the issue of peroxide byproducts, such as organic acids or alcohols, which need to be removed with additional heating. There is also usually some discoloration associated with peroxide cured silicones.

In general, the currently available cross-linkable silicones, utilizing platinum catalyzed addition cure systems, tin catalyzed moisture/condensation cure systems and peroxide hydrogen-abstraction cure systems, can deliver microreplication of acceptable quality but there are limitations shared by these systems: functional silicones, catalysts/initiators, thermal cycles, and byproducts. These limitations negatively affect silicone microreplication economically and from a processing standpoint.

SUMMARY

There is a need for an economical and improved process for silicone microreplication that utilizes catalyst/initiator free processing. In one aspect, the present disclosure provides a method of making a surface-structured, cross-linked silicone-based material, the method comprising:

providing a surface-structured composition comprising silicone-based material, wherein the composition is substantially free of catalysts and initiators;

exposing the surface-structured composition to an electron-beam to cross-link the silicone-based material to provide the surface-structured, cross-linked silicone-based material.

In some embodiments, the method further comprises:
providing replication tool having a major surface of at least one of nano-sized or micro-sized surface structures, and applying the composition comprising the silicone-based material that is substantially free of catalysts and initiators onto at least a portion of the major surface of the replication tool to form the surface-structured composition comprising silicone-based material that is substantially free of catalysts and initiators.

In some embodiments, the method further comprise:
providing a substrate having a first major surface;
coating the composition comprising the silicone-based material that is substantially free of catalysts and initiators on at least a portion of the major surface of the substrate; and
contacting the coated composition with a major surface of a replication tool having at least one of nano-sized or micro-sized surface structures on the major surface to form the surface-structured composition comprising silicone-based material that is substantially free of catalysts and initiators.

In some embodiments, the method further comprise:
applying a primer coating composition onto at least a portion of the major surface of the substrate before coating the composition comprising the silicone-based material that is substantially free of catalysts and initiators thereon.

In some embodiments, the surface structures comprise micro-sized structures, nano-sized structures, or both. In some embodiments, the surface-structured, cross-linked silicone-based material has two generally opposed major surfaces with the structures on one or both major surfaces. In some embodiments, the surface-structured, cross-linked silicone-based material has two generally opposed major surfaces with first cross link density on one major surface and a cross link density on the generally opposed major surface, wherein the first cross-link density is greater than the second cross-link density.

As used herein, a composition is "substantially free of catalysts and initiators" if the composition does not include any catalyst and initiator or does not include an "effective amount" of a catalyst and/or initiator. A particular catalyst or initiator is present at an "effective amount" if the amount of catalyst or initiator reduces the cure time of the composition by at least 10% relative to the cure time for the same composition at the same curing conditions, absent that catalyst or initiator.

In another aspect, the present disclosure also provides an article comprising a substrate having a first major surface with the surface-structured silicone-based material described herein on at least a portion of the first major surface. In some embodiments, the substrate has a second major surface generally opposed the first major surface and the surface-structured silicone-based material described herein on at least a portion of the second major surface. In some embodiments there is a primer between the major surface and the silicone-based material.

In some embodiments, the silicone-based material is a nonfunctionalized silicone-based material. In some embodiments, the silicone-based material comprises a siloxane backbone and at least one functional group. In some embodiments, all functional groups are hydroxy groups.

In some embodiments, the cross-linked silicone-based material is a silicone pressure sensitive adhesive. In some embodiments, the cross-linked silicone-based material is a foam (e.g., a silicone foam). In some embodiments, the cross-linked silicone-based material is a non-tacky foam.

In some embodiments, the silicone-based material is a polysiloxane (e.g., a poly(dialkyl siloxane) or a poly(dimethyl siloxane)). In some embodiments, the polysiloxane bears aromatic groups.

In some embodiments, the silicone-based material further comprises a tackifier (e.g., an MQ resin tackifier).

In some embodiments, the silicone-based material is a non-tacky film.

Embodiments of silicone-based materials described herein are useful, for example, in applications of light capture, anti-reflection, light redirection, light diffusion, hydrophobic surfaces, hydrophilic surfaces, light guiding, light collimation, light concentration, Fresnel lens, retro-reflection, drag reduction, air bleed adhesives, release liner, abrasion resistance, and anti-fouling.

DETAILED DESCRIPTION

Figure 1:
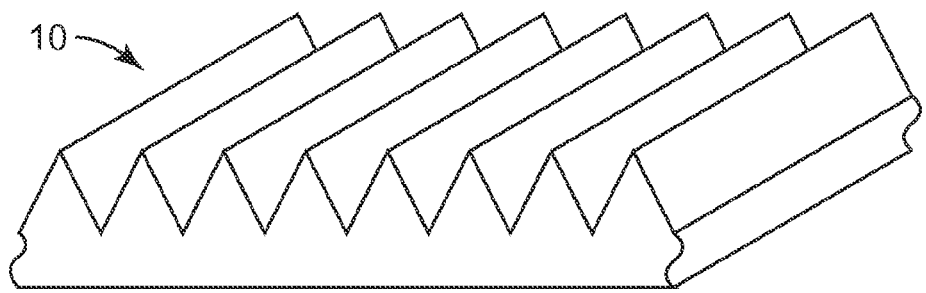
FIG. 1 is a perspective view of an exemplary surface-structured cross-linked silicone article described herein.

Generally, the cross-linked siloxane networks of the silicone-based materials can be formed from either functional or non-functional silicone materials. Generally, the silicone-based materials may be oils, fluids, gums, elastomers, or resins (e.g., friable solid resins). In some embodiments, the nonfunctionalized silicone-based materials can be a linear material described by the following formula illustrating a siloxane backbone with aliphatic and/or aromatic substituents:

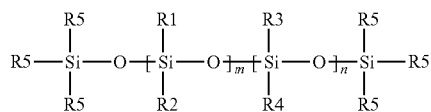

(1)

wherein R1, R2, R3, and R4 are independently selected from the group consisting of an alkyl group and an aryl group, each R5 is an alkyl group and n and m are integers, and at least one of m or n is not zero. In some embodiments, at least one of the alkyl or aryl groups may contain a halogen substituent (e.g., fluorine). For example, in some embodiments, at least one of the alkyl groups may be —CH$_2$CH$_2$C$_4$F$_9$.

In some embodiments, R5 is a methyl group (i.e., the nonfunctionalized silicone material is terminated by trimethylsiloxy groups). In some embodiments, R1 and R2 are alkyl groups and n is zero (i.e., the material is a poly (dialkylsiloxane)). In some embodiments, the alkyl group is a methyl group (i.e., poly(dimethylsiloxane) ("PDMS")). In some embodiments, R1 is an alkyl group, R2 is an aryl group, and n is zero (i.e., the material is a poly(alkylarylsiloxane)). In some embodiments, R1 is methyl group and R2 is a phenyl group (i.e., the material is poly(methylphenylsiloxane)). In some embodiments, R1 and R2 are alkyl groups and R3 and R4 are aryl groups (i.e., the material is a poly(dialkyldiarylsiloxane)). In some embodiments, R1 and R2 are methyl groups, and R3 and R4 are phenyl groups (i.e., the material is poly(dimethyldiphenylsiloxane) or poly (methylphenylsiloxane)).

In some embodiments, the nonfunctionalized silicone materials may be branched. For example, at least one of the R1, R2, R3, and/or R4 groups may be a linear or branched siloxane with alkyl or aryl (including halogenated alkyl or aryl) substituents and terminal R5 groups.

As used herein, "nonfunctional groups" are either alkyl or aryl groups consisting of carbon, hydrogen, and in some embodiments, halogen (e.g., fluorine) atoms. As used herein, a "nonfunctionalized silicone material" is one in which the R1, R2, R3, R4, and R5 groups are nonfunctional groups.

Generally, functional silicone systems include specific reactive groups attached to the siloxane backbone of the starting material (e.g., hydrogen, hydroxyl, vinyl, allyl, or acrylic groups). As used herein, a "functionalized silicone material" is one in which at least one of the R-groups of Formula 2 is a functional group.

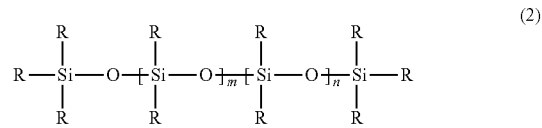

(2)

In some embodiments, a functional silicone material is one is which at least 2 of the R-groups are functional groups. Generally, the R-groups of Formula 2 may be independently selected. In some embodiments, the only functional groups present are hydroxyl groups (e.g., silanol terminated polysiloxanes (e.g., silanol terminated poly dimethyl siloxane)).

In addition to functional R-groups, the R-groups may be nonfunctional groups (e.g., alkyl or aryl groups, including halogenated (e.g., fluorinated) alky and aryl groups). In some embodiments, the functionalized silicone materials may be branched. For example, at least one of the R groups may be a linear or branched siloxane with functional and/or non-functional substituents.

Generally, lower molecular weight, lower viscosity materials are referred to as fluids or oils, while higher molecular weight, higher viscosity materials are referred to as gums; however, there is no sharp distinction between these terms. Typically, the terms "fluid" and "oil" refer to materials having a dynamic viscosity at 25° C. of no greater than 1,000,000 mPa·sec (e.g., less than 600,000 mPa·sec), while materials having a dynamic viscosity at 25° C. of greater than 1,000,000 mPa·sec (e.g., at least 10,000,000 mPa·sec) are referred to as "gums".

Surface-structured, cross-linked silicone-based materials described herein may also comprise inorganic particles (including nanoparticles) therein. Examples of suitable inorganic materials include silica, zirconia, titania, and combination thereof. Typically, it is desirable for the inorganic particles to have a size not greater than 2 micrometers, although larger sizes may also be useful. Silica particles are preferably not greater than 1 micrometer although larger sizes may also be useful. Preferably, particles made of other materials are in the nanometer size range e.g., in the range of from about 5 nm up to about 50 nm). Silica particles in the nanometer size range may also be useful. Such particles, especially nanoparticles, may also be loaded into the silicone elastomeric material in the range of from 0 wt. % to about 60 wt. %.

Examples of fillers include: fumed silica, fused silica, quartz powder, glass bubbles, milled glass fibers, carbon, diatomaceous earth, clay, carbon nano-tubes, carbon black, metal oxides (e.g., iron oxide, titanium oxide, and cerium oxide) and metal carbonates (e.g., calcium carbonate and magnesium carbonate). In some embodiments, it may be desirable to include pigments, dyes, UV absorbers, and/or antioxidants in the surface-structured, cross-linked silicone-based material described herein.

In some embodiments, the silicone-based material described herein is a pressure sensitive adhesive. In some embodiments, the cross-linked material is non-tacky.

The pressure sensitive adhesives may be prepared by combining silicone materials (e.g., silicone gums or elastomers) with an appropriate tackifying resin, hot melt coating the resulting combination, and curing using electron beam (E-beam) irradiation. Generally, any known additives useful in the formulation of pressure sensitive adhesives (e.g., dyes, pigments, fillers, flame retardants, rheology modifiers, flow agents, surfactants, chopped glass fibers, and microspheres (e.g., expandable microspheres) may be also be included)).

Generally, any known tackifying resin may be used (e.g., in some embodiments, silicate tackifying resins may be used). In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 g/mole to 50,000 g/mole (e.g., 500 g/mole to 15,000 g/mole) and generally R' groups are methyl groups.

MQ silicate tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "TOH" units), thereby accounting for some silicon-bonded hydroxyl content of the silicate tackifying resin.

The level of silicon-bonded hydroxyl groups (i.e., silanol) on the MQ resin may be reduced to no greater than 1.5 weight percent (in some embodiments, no greater than 1.2 weight percent, no greater than 1 weight percent, or even no greater than 0.8 weight percent), based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylsilating reagents such as trimethylchlorosilane or trimethylsilylacetamide may be reacted with the silicate tackifying resin, a catalyst not being necessary in the latter case.

MQD silicone tackifying resins are terpolymers having M, Q and D units. In some embodiments, some of the methyl R' groups of the D units can be replaced with vinyl (CH2=CH—) groups ("$D_{vi}$" units). MQT silicate tackifying resins are terpolymers having M, Q and T units.

Suitable silicate tackifying resins are available, for example, under the trade designations "DC 2-7066" from Dow Corning Corporation. Midland, Mich.; and "SR545" and "SR1000" from Momentive Performance Materials, Inc., Waterford, N.Y.

The silicone material, the tackifying resin, and any optional additives may be combined by any of a wide variety of known means prior to being hot melt coated and cured. For example, in some embodiments, the various components may be pre-blended using common equipment (e.g., mixers, blenders, mills, and extruders). In some embodiments, the hot melt coating process is extrusion. In such embodiments, the various components may be added together, in various combinations or individually, through one or more separate ports of an extruder, blended (e.g., melt mixed) within the extruder, and extruded to form the hot melt coated composition. Regardless of how it is formed, the hot melt coated composition is cured through exposure to E-beam irradiation.

In some embodiments, the methods and materials of the present disclosure may be used to foam silicone, including silicones. Silicone foams provide unique properties, including: resilience, wide service temperature stability (e.g., about 50° C. to about 200° C.), inertness, and inherent flame retardancy. Generally, silicone foams have been made in processes where cell growth or expansion (i.e., the foaming process) and cell stabilization (i.e., the cross-linking process) are happened simultaneously. Most common cell expansion chemistries for silicone foams rely on chemical blowing agents (e.g., azo containing compounds or condensed gas by-product from cross-linking reactions).

In contrast, through the use of the electron beam (e-beam) curing process of the present disclosure, the cell expansion or foaming process and cell stabilization or cross-linking process can be independently optimized. In some embodiments, this can lead to improved control over cell structures with uniform distribution of foam cell sizes. The E-beam cured silicone foams can be made with microspheres, including both rigid non-polymeric hollow microspheres (e.g., glass bubbles), polymeric microspheres, including thermally expandable polymeric microspheres), chopped glass fibers, and/or nanoparticles.

The silicone material, the microsphere, and any optional additives may be combined by any of a wide variety of known means prior to being hot melt coated and cured. For example, in some embodiments, the various components may be pre-blended using common equipment (e.g., mixers, blenders, mills, and extruders). In some embodiments, the hot melt coating process is extrusion. In such embodiments, the various components may be added together, in various combinations or individually, through one or more separate ports of an extruder, blended (e.g., melt mixed) within the extruder, and extruded to form the hot melt coated composition. Regardless of how it is formed, the hot melt coated composition is cured through exposure to E-beam irradiation.

In another aspect, the present disclosure provides an article comprising a substrate having a first major surface with the surface-structured silicone-based material described herein on at least a portion of the first major surface. FIG. 1 illustrates a perspective view of an exemplary structured surface film described herein 10 having a surface-structured pattern. In some embodiments, the structured surface preferably has peak to valley measurements of less than 2500 micrometers (preferably, preferably less than 250 micrometers, or even less than 100 micrometers). The portion of the structured surface film beneath the structured surface, sometimes referred to as the "land" area, is preferably at least as thick as the peak to valley measurement of the structured surface.

Figure 2:
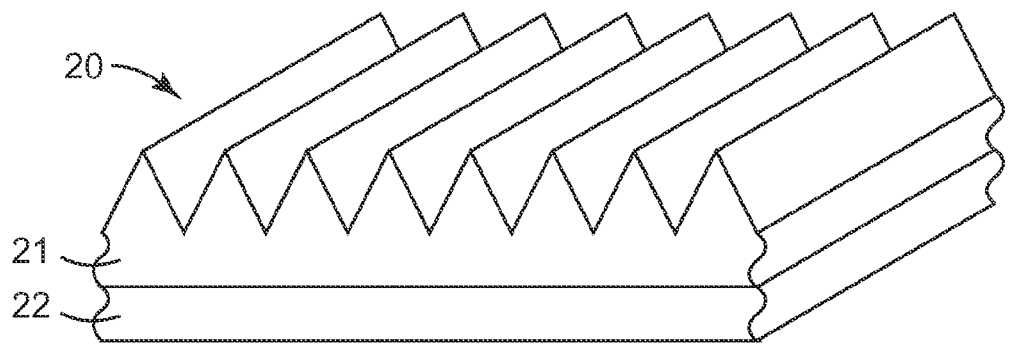
FIG. 2 is a perspective view of an exemplary surface-structured cross-linked silicone adhesive layer described herein attached to a substrate layer.

In some embodiments, the substrate has a second major surface generally opposed to the first major surface and the surface-structured silicone-based material described herein on at least a portion of the second major surface. In some embodiments, the substrate is a foam. In some embodiments there is a primer between the major surface and the silicone-based material. In some embodiments, the article is an adhesive article, wherein the silicone-based material described herein that is a pressure sensitive adhesive adhered to at least a portion of the first major surface of the substrate. FIG. 2 illustrates a perspective view of an exemplary structured surface adhesive film described herein 20 having structured surface adhesive 21 attached to substrate layer 22. In some embodiments, the cross-linked material is non-tacky.

Examples of substrates include at least one of a polymeric film, a polymeric sheet, a molded polymeric part, a metal (including a metal surface) (e.g., vapor deposited metals)) such as aluminum or stainless steel, paper, an ultraviolet (UV) mirror, infrared (IR) mirror, a UV stable substrate, a glass (e.g., soda-lime glass, low-iron glass, borosilicate glass, or quartz (fused silica)) substrate, a portion (e.g., hood, door, roof, side panel, trunk, or bumper) of a car, a portion (e.g., wing or fuselage) of a plane, a portion (e.g., roof or side) of a train, a wind turbine blade (e.g., any exterior portion of a turbine blade including the leading edge of the blade), a solar photovoltaic module (including a flexible photovoltaic module and a concentrating photovoltaic module), a solar thermal panel, a boat hull, a mirror, a traffic sign, a display, a window (including an architectural window and an automobile window), a reinforcing scrim, a textile, a release liner, a transdermal skin patch, or a photo bio reactor liner. The substrate may be flat, curved or shaped.

In some embodiments, the substrates are transparent (i.e., transmit at least 85% of incident light in at least a [portion of the visible spectrum (400-700 nm wavelength). Transparent substrates may be colored or colorless.

Examples of polymeric substrates include polyester (e.g., polyethylene terephthalate, polybutylene terephthalate), cyclic olefin co-polymer (COC), fluoropolymers (e.g., ethylene tetrafluorethylene, polyvinylidene fluoride, THV), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters (e.g., acetate and butyrate). In some embodiments, the substrate is flexible and made from polyesters (e.g., polyethylene terephthalate (PET)), cyclic olefin co-polymer (COC), polyolefins (e.g., PP (polypropylene), PE (polyethylene) and PVC (polyvinyl chloride) are particularly preferred. The substrate can be formed into a film using conventional filmmaking techniques such as extrusion of the substrate resin into a film and optional uniaxial or biaxial orientation of the extruded film.

UV mirrors are known in the art and include a multilayer optical film constructed of alternating layers of a UV stabilized polyethylene terephthalate (PET) and a copolymer of methylmethacrylate and ethyl acrylate (co-PMMA) at thicknesses one quarter of the wavelength of the light they will reflect. This UV mirror has alternating polymer layers in the range of thicknesses that reflect UV light while passing visible light.

IR mirrors are known in the art and include a multilayer optical film constructed of alternating layers of a UV stabilized polyethylene terephthalate (PET) and a copolymer of methylmethacrylate and ethyl acrylate (co-PMMA) at thicknesses one quarter of the wavelength of the light they will reflect. This IR mirror has alternating polymer layers in the range of thicknesses that reflect IR light while passing visible light.

UV stable substrates are known in the art and include a film or part made from a polymer that generally maintains its optical and mechanical properties during outdoor exposure to sunlight and the elements for a period of at least 10 years either through the addition of UV absorbers, anti-oxidants and hindered amine light stabilizers and/or through the polymer's intrinsic weatherability (e.g., fluoropolymers).

Solar photovoltaic modules are known in the art, and refer to the glass front surface of a module for rigid photovoltaic modules (e.g., crystalline silicon modules). For flexible photovoltaic modules that utilize thin-film technologies, the front surface substrate is generally a UV stable polymer film (e.g., ethylene tetrafluoroethylene).

Solar thermal modules are known in the art and capture thermal energy by collecting the suns energy and heating a fluid. Solar thermal modules are similar to photovoltaic modules in that they are generally rigid and have a glass front surface.

Reinforcing scrims are known in the art and include woven or non-woven fabric, that when impregnated with a resin and cured, provide improved dimensional stability and tensile properties by decreasing elongation and increasing strength of the resulting composite.

Textiles are known in the art and include directionally flexible materials made of a network of natural or artificial fibers which are often used to make clothes, bags, furniture, tents, umbrellas, etc.

Release liners are known in the art and are generally a paper or plastic based carrier web material, which is coated on one or two sides with a release agent, which provides a release effect against any type of a sticky material (e.g., an adhesive or a mastic).

Photobioreactors are known in the art and are bioreactors which incorporates some type of light source to provide photonic energy input into the reactor, generally used to cultivate microalgae. It is desirable to prevent accumulation of microalgae or other build-up on the inner walls of the photobioreactor therefore anti-fouling structures may be applied to the walls to prevent accumulation.

Figure 3:
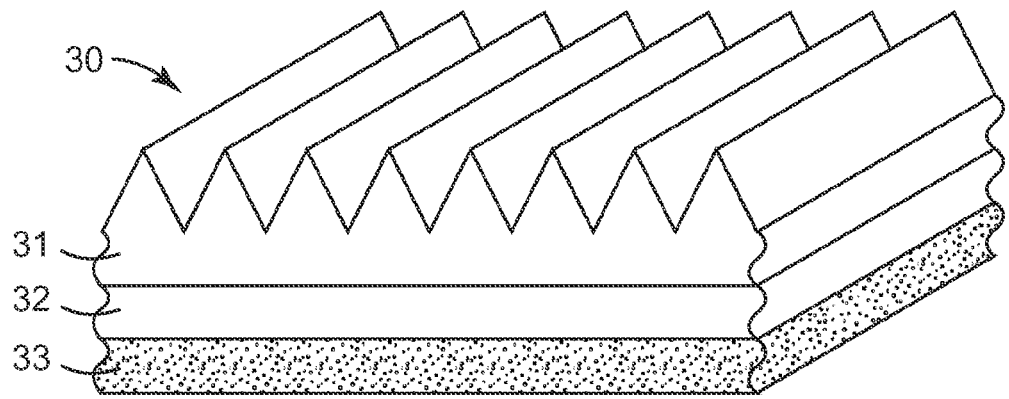
FIG. 3 is a perspective view of an exemplary surface-structured cross-linked silicone described herein attached to a substrate with a primer layer.

In some embodiments of the surface-structured, cross-linked silicone-based material described herein that are on a substrate, there is a primer coating between the cross-linked silicone-based material and the substrate surface. FIG. 3 illustrates a perspective view of an exemplary structured surface film described herein 30 having structured surface 31 attached to substrate 33 with primer layer 32. Preferably, such primer coating is formed from a nanoparticle-containing coating composition that is coated and dried on a substrate surface. Other primer compositions or processes can be used to achieve acceptable adhesion between silicone and a substrate. Examples of such compositions include the use of reactive silane solutions or solutions of moisture cure/condensation reaction silicones, etc. Examples of commercially available primers include "3-6060 PRIME COAT" from Dow-Corning, Midland. Mich.; and "SS4120 SILICONE PRIMER" from Momentive Performance Materials.

Another example of suitable silane primer is 3-aminopropyltriethoxysilane. Although the following discussion focuses on nanoparticle-containing primer coatings, various features described (e.g., coating thickness) apply to other primer coatings.

In certain embodiments, the nanoparticle-containing primer coating composition includes an aqueous dispersion having a pH of less than 5 comprising silica nanoparticles having average particle diameters of up to 40 nanometers (preferably less than 20 nanometers), and an acid having a $pK_a$ of ≤3.5 (preferably <2.5, most preferably less than 1). A preferred is nanoparticle-containing primer comprises agglomerates of silica nanoparticles having average particle diameters of up to 40 nanometers, the agglomerates comprising a three-dimensional porous network of silica nanoparticles, and the silica nanoparticles are bonded to adjacent silica nanoparticles.

These acidified aqueous silica nanoparticle primer coating compositions, can be coated directly onto hydrophobic organic and inorganic substrates without either organic solvents or surfactants. The wetting property of these inorganic nanoparticle aqueous dispersions on hydrophobic surfaces (e.g., polyethylene terephthalate (PET) or polycarbonate (PC) is a function of the pH of the dispersions and the $pK_a$ of the acid). The primer coating compositions are coatable on hydrophobic organic substrates when they are acidified with HCl to pH=2 to 3, and even to 4 or 5 in some embodiments. In contrast, the primer coating compositions bead up on the organic substrates at neutral or basic pH.

The silica nanoparticles used in this primer composition are dispersions of submicron size silica nanoparticles in an aqueous or in a water/organic solvent mixture. Generally, the silica nanoparticles have an average primary particle diameter of up to 40 nanometers, preferably less than 20 nanometers, and more preferably less than 10 nanometers. The average particle size may be determined using transmission electron microscopy. The nanosilica described in this disclosure may be spherical or nonspherical. The silica nanoparticles are preferably not surface modified.

The smaller nanoparticles (i.e., those up to 20 nanometers), generally provide better primer coatings, when acidified, without the need for additives (e.g., tetraalkoxysilanes, surfactants, and organic solvents). Further, the nanoparticles generally have a surface area greater than 150 m$^2$/g (in some embodiments, greater than 200, 300, or even greater than 400 m$^2$/g). The particles preferably have narrow particle size distributions, that is, a polydispersity (i.e., particle size distribution) up to 2, preferably up to 1.5. If desired, larger silica particles may be added, in limited amounts that do not deleteriously decrease the coatability of the composition on a selected substrate, and do not reduce the transmissivity and/or the hydrophilicity.

Inorganic silica sols in aqueous media are well known in the art and available commercially. Silica sols in water or water-alcohol solutions are available, for example, under the trade designations "LUDOX" from E.I. duPont de Nemours and Co., Inc., Wilmington, Del.; "NYACOL" from Nyacol Co., Ashland, Mass.; and "NALCO" from Ondea Nalco Chemical Co., Oak Brook, Ill. One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "REMASOL 5P30," commercially available from Remet Corp., Utica, N.Y., and "LUDOX SM," commercially available from E.I. Du Pont de Nemours Co., Inc., and "SNOWTEX ST-OUP", "SNOWTEX ST-UP", and "SNOWTEX ST-PS-S" from Nissan Chemical Co., Houston, Tex.

Non-aqueous silica sols (also called silica organosols) may also be used and are silica sol dispersions wherein the liquid phase is an organic solvent, or an aqueous organic solvent. In the practice of this disclosure, the silica sol is chosen so that its liquid phase is typically aqueous or an aqueous organic solvent. It has been observed that sodium stabilized silica nanoparticles should first be acidified prior to dilution with an organic solvent (e.g., ethanol). Dilution prior to acidification may yield poor or non-uniform coatings. Ammonium stabilized silica nanoparticles may generally be diluted and acidified in any order.

The primer coating composition contains an acid or combination of acids, each having a $pK_a$ ($H_2O$) of <3.5, preferably <2.5, most preferably less than 1. Useful acids include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, and $CF_3CO_2H$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a $pK_a$≤3.5 (preferably <2.5, most preferably less than 1), optionally with minor amounts of other acids having $pK_a$'s>0. It has been found that weaker acids having a $pK_a$ of >4 (e.g., acetic acid), do not provide a uniform coatings having the desirable properties of transmissivity and/or durability. In particular, primer coating compositions with weaker acids (e.g., acetic acid) typically bead up on the surface of a substrate.

The primer coating composition generally contains sufficient acid to provide a pH of less than 5, preferably less than 4, most preferably less than 3. In some embodiments, it has been found that the pH of the coating composition can be adjusted to pH 5-6 after reducing the pH to substantially less than 5. This allows one to coat pH-sensitive substrates.

Tetraalkoxy coupling agents, particularly tetraalkoxysilanes (e.g., tetraethylorthosilicate (TEOS)), and oligomeric forms of tetraalkoxysilane (e.g., alkyl polysilicates (e.g., poly(diethoxysiloxane))), may also be useful to improve binding between silica nanoparticles. The optimal amount of coupling agent is determined experimentally and is dependent on the coupling agent's identity, molecular weight and refractive index. The coupling agent(s), when present, are typically added to the composition at levels of 0.1 to 50 percent by weight (wt-%) of the silica nanoparticle concentration, and more preferably 1 to 15 percent by weight of the silica nanoparticles.

The primer typically provides the surface coated thereon with a continuous network of silica nanoparticles agglomerates. The particles preferably have an average primary particle size of below 40 nanometers. The average particle size may be determined using transmission electron microscopy. As used herein, the term "continuous" refers to covering the surface of the substrate with virtually no discontinuities or gaps in the areas where the gelled network is applied. The term "network" refers to an aggregation or agglomeration of nanoparticles linked together to form a porous three-dimensional network. The term "primary particle size" refers to the average size of unagglomerated single particles of silica.

The term "porous" refers to the presence of voids between the silica nanoparticles created when the nanoparticles form a continuous coating. Preferably, the network has a porosity of 25 to 45 volume percent, more preferably 30 to 40 volume percent, when dried. In some embodiments the porosity may be higher. Porosity may be calculated from the refractive index of the coating according to published procedures such as in W. L. Bragg, A. B. Pippard, Acta Crystallographica, volume 6, page 865 (1953).

To uniformly coat a primer composition onto a hydrophobic substrate from an aqueous system it may be desirable to increase the surface energy of the substrate and/or reduce the surface tension of the coating composition. The surface energy may be increased by oxidizing the substrate surface prior to coating using corona discharge or flame treatment methods. These methods may also improve adhesion of the coating to the substrate. Other methods capable of increasing the surface energy of the article include the use of primers such as thin coatings of polyvinylidene chloride (PVDC). Alternatively, the surface tension of the coating composition may be decreased by addition of lower alcohols ($C_1$ to $C_8$). In some instances, however, in order to improve the coating hydrophilicity for desired properties and to ensure uniform coating of the article from an aqueous or hydroalcoholic solution, it may be beneficial to add a wetting agent, which is typically a surfactant, to the primer composition.

The term "surfactant" as used herein describes molecules comprising hydrophilic (polar) and hydrophobic (non-polar) regions on the same molecule which are capable of reducing the surface tension of the coating solution. Useful surfactants may include those disclosed in U.S. Pat. No. 6,040,053 (Scholz et al.).

For typical concentrations of silica nanoparticles (e.g., 0.2 to 15 percent by weight relative to the total coating composition) most surfactants comprise less than 0.1 percent by weight of the coating composition, preferably 0.003 to 0.05 percent by weight.

Anionic surfactants in the primer coating composition are preferred when added to improve the uniformity of the resulting coatings. Useful anionic surfactants include those with molecular structures comprising (1) at least one hydrophobic moiety, such as $C_6$-$C_{20}$ alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate (available, for example, under the trade designations "TEXAPON L-100" from Henkel Inc., Wilmington, Del.; and "POLYSTEP B-3" from Stepan Chemical Co, Northfield, Ill.); sodium lauryl ether sulfate (available, for example, under the trade designation "POLYSTEP B-12" from Stepan Chemical Co., Northfield, Ill.); ammonium lauryl sulfate (available, for example, under the trade designation "STANDAPOL A" from Henkel Inc., Wilmington, Del.); and sodium dodecylbenzenesulfonate (available, for example, under the trade designation "SIPONATE DS-10" from Rhone-Poulenc, Inc., Cranberry, N.J.).

Where a primer does not include a surfactant or when improved coating uniformity is desirable, it may be beneficial to add another wetting agent in order to ensure uniform coating of a surface from an aqueous or hydroalcoholic solution. Examples of useful wetting agents include polyethoxylated alkyl alcohols (available, for example, under the trade designations "BRIJ 30" and "BRIJ 35 from ICI Americas, Inc.; and "TERGITOL TMN-6" SPECIALTY SURFACTANT" from Union Carbide Chemical and Plastics Co.), polyethoxylated alkylphenols (available, for example, under the trade designations, "TRITON X-100" from Union Carbide Chemical and Plastics Co., "ICONOL NP-70" from BASF Corp., Florham Park, N.J.); and polyethylene glycol/polypropylene glycol block copolymer (available, for example, under the trade designations "TETRONIC 1502 BLOCK COPOLYMER SURFACTANT", "TETRONIC 908 BLOCK COPOLYMER SURFACTANT", and "PLURONIC F38 BLOCK COPOLYMER SURFACTANT" from BASF Corp.). Generally the wetting agent is used in amounts of less than 0.1 percent by weight of the coating composition, preferably 0.003 to 0.05 percent by weight of the coating composition depending on the amount of silica nanoparticles. Rinsing or steeping the coated article in water may be desirable to remove excess surfactant or wetting agent.

Primers are preferably coated on a surface using conventional techniques, such as bar, roll, curtain, rotogravure, spray, or dip coating techniques. The preferred methods include bar and roll coating, or air knife coating to adjust thickness. In order to ensure uniform coating and wetting of the film, it may be desirable to oxidize the substrate surface prior to coating using corona discharge or flame treatment methods. Other methods capable of increasing the surface energy of the article include the use of primers such as polyvinylidene chloride (PVDC).

The primer is preferably applied in uniform average thicknesses varying by less than 200 angstroms, and more preferably by less than 100 angstroms, in order to avoid visible interference color variations in the coating. The optimal average dry coating thickness is dependent upon the particular primer coating composition, but in general the average thickness of the coating is 100 angstroms to 10,000 angstroms, preferably 500 angstroms to 2500 angstroms, more preferably 750 angstroms to 2000 angstroms, and even more preferably 1000 angstroms to 1500 angstroms, as measured using an ellipsometer such as a Gaertner Scientific Corp Model No. L115C. It should be noted, however, that while the average coating thickness is preferably uniform, the actual coating thickness can vary considerably from one particular point on the coating to another.

Primers can be coated on both sides of a substrate if desired. Alternatively, the primers may be coated on one side of the substrate.

Once coated, the primed article is typically dried at temperatures in a range from 20° C. to 150° C. in a recirculating oven. An inert gas may be circulated. The temperature may be increased further to speed the drying process, but care should be exercised to avoid damage to the substrate. For inorganic substrates, the cure temperature can be above 200° C. After the primer coating composition is applied to the substrate and dried, the coating comprises preferably from 60 to 95 percent by weight (more preferably from 70 to 92 percent by weight) of silica nanoparticles (typically agglomerated), from 0.1 to 20 percent by weight (more preferably from 10 to 25 percent by weight) tetraalkoxysilanes and optionally 0 to 5 percent by weight (more preferably from 0.5 to 2 percent by weight) surfactant, and optionally up to 5 percent by weight (preferably 0.1 to 2 percent by weight) wetting agent.

Additional details on some primers can be found in application having U.S. Ser. Nos. 61/328,939, filed Apr. 28, 2010, 61/360,145, filed Jun. 30, 2010, and 61/390,491 filed the same date as the instant application.

In general, the procedures for making a structured silicone utilize a tool that will impart the negative structure in the silicone surface before the silicone is cross-linked using electron beam radiation. The tooling can be of a variety of forms and materials. Commonly the form of the tooling will either be a sheet, roll, belt or roll of film. Tooling is generally constructed of material that fall either into the category of metal or polymer but could potentially include ceramic or other suitable material. For metal tools, the metal is generally diamond-machined, embossed, knurled, sandblasted, etc. to form the surface structure. In the case of polymer tools the structured polymer surface is generally formed by extrusion replication where a thermoplastic resin such as polypropylene is extruded using standard extrusion equipment and fed through a die and into a nip with a machined metal tool roll and a rubber roll. The molten polymer is quenched while in contact with a tool surface which then releases from the tool roll and is wound on a roll. Additional polymer tooling can be made by UV-curing acrylate functional resins against a tool followed by removal of the cross-linked structured film from the tool. The following polymers are potential options for polymer tools: polypropylene, polyethylene, polyethylene terephthalate, ethylene/octene, ethylene/hexene, other ethylene copolymers, propylene/ethylene, propylene copolymers of lower modulus, UV-curable acrylates, poly(methyl methacrylate), polycarbonate, polystyrene, styrene acrylonitrile, polyurethane or other suitable materials.

Generally, the non-cross-linked silicone material is brought into intimate contact with the tooling surface by way of direct coating silicone fluid or gum against the tooling surface. Other options include pressing the silicone material between the tooling and a substrate using nip rolls or a platen press. To achieve the best replication quality the silicone must be cross-linked while in contact with the tool. Therefore the silicone passes through an electron beam unit while still in contact with the tool. In the case of using polymer tooling, generally the electron beam radiation can penetrate from either the tooling film side or the silicone side. When a substrate and tooling are present in a construction, the electron beam may pass through the tooling side or the substrate side depending on the thickness and density of the tooling and the substrate. Generally it is unfavorable to irradiate through thick or very dense materials because such materials absorb the electrons before they can reach and cross-link the silicone. When the tool is metal it is best to irradiate the construction through the silicone or substrate side since metal is usually too dense to allow the radiation through unless it is very thin. One skilled in the art will be able to select the proper electron beam acceleration voltage to account for the thickness of the tooling, silicone and substrate layers and also will be able to select the proper dose to properly cross-link the silicone material.

Figure 4:
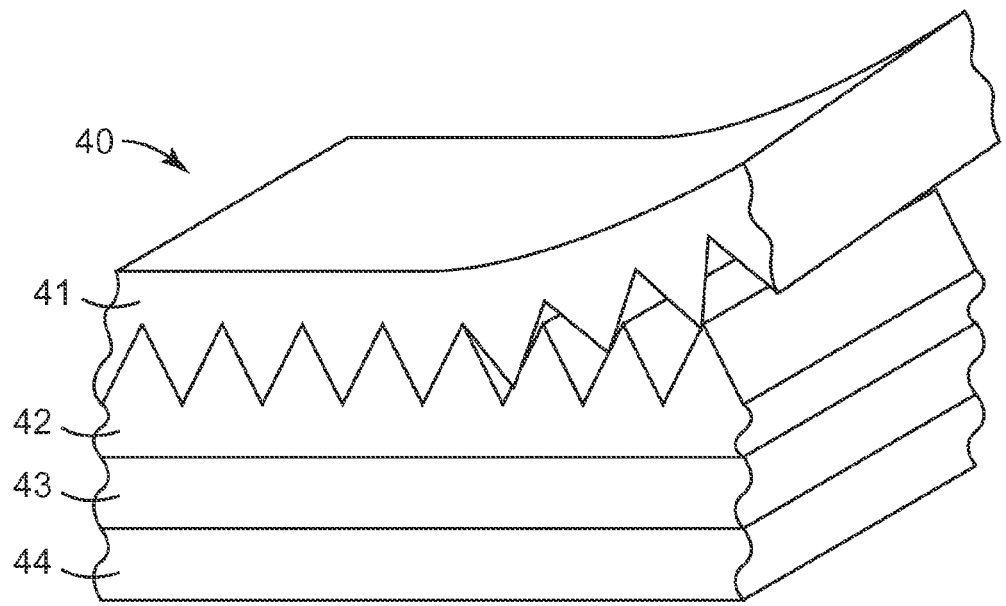
FIG. 4 is a perspective view of an exemplary structure-surface tooling film described herein as it is removed to expose the final structure-surface on the substrate.
Figure 5:
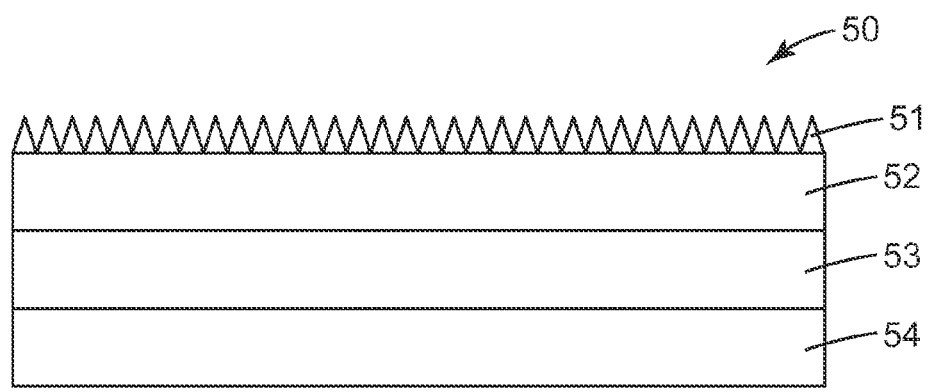
FIG. 5 is a schematic view of an exemplary surface-structured cross-linked silicone described herein attached to a film with a primer layer and an adhesive layer on the opposing surface of film.

After the silicone is cross-linked by the electron beam radiation the permanently structured silicone may be removed from the tooling. When a substrate is used, the silicone will release from the tool and stay attached to the substrate as long as there is adhesion between the silicone and the substrate, which may be enhanced using a suitable primer (discussed above). As illustrated in FIG. 4, exemplary structured surface tooling film 41 may be removed to expose final structured surface 42 attached to substrate 44 with primer 43. The structured surface tooling film may be removed manually or with a machine. FIG. 5 illustrates a schematic view of exemplary structured surface film 50 having structured surface 51 attached to substrate 54 with primer layer 53 and adhesive layer 52.

Figure 6:
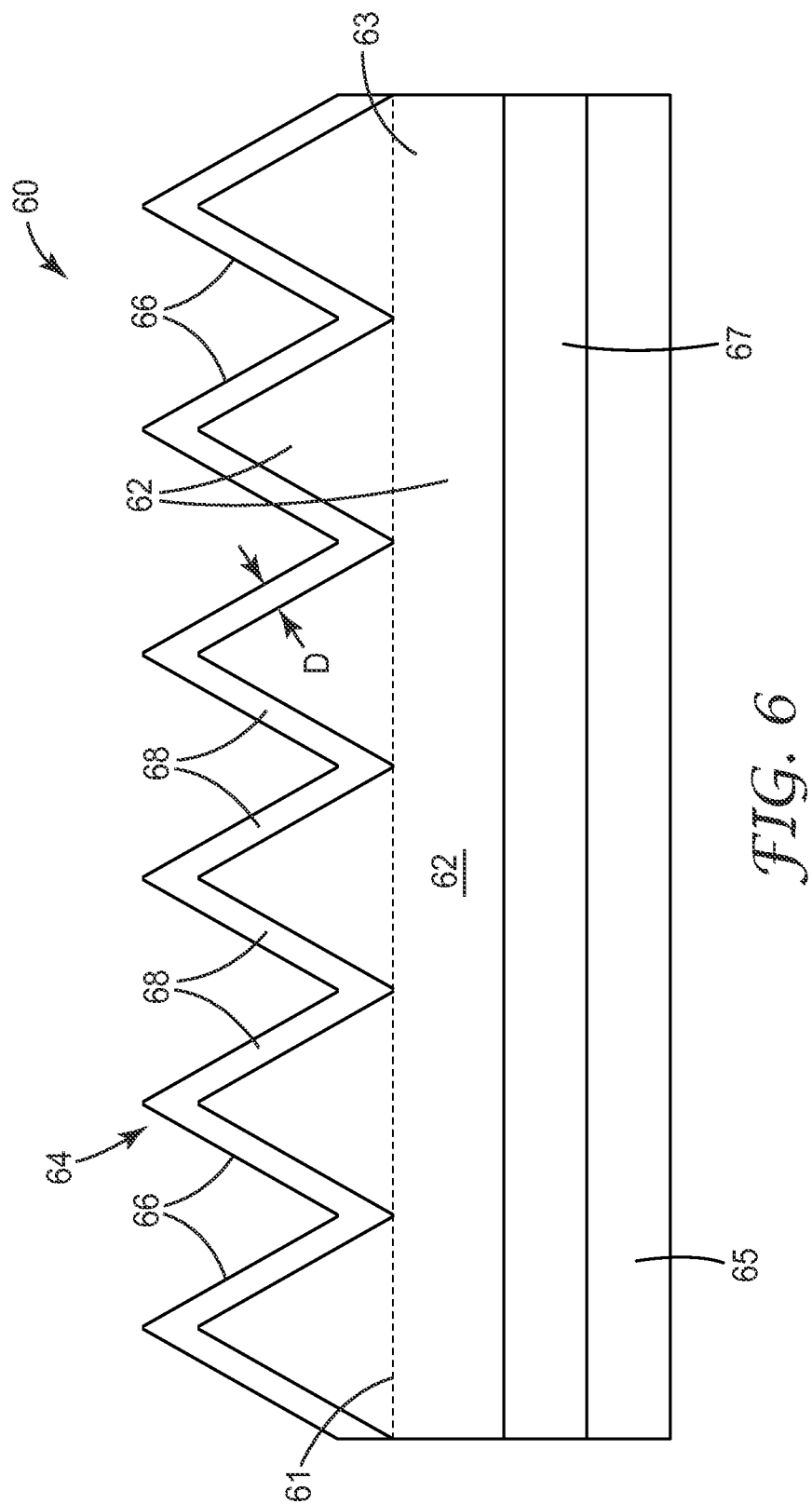
FIG. 6. is a schematic view of an exemplary surface-structured cross-linked silicone described herein having a higher cross-link density at the surface attached to a substrate with a primer layer and FIG. 7. is a schematic view of an exemplary surface-structured cross-linked silicone described herein having a higher cross-link density near the surface attached to a substrate with a primer layer.

In some embodiments, it may be advantageous to increase the cross-link density of the already cross-linked surface-structured silicone-based material in a second pass through an electron beam unit. The higher cross-link density of the silicone elastomer surface results in an increased resistance to dirt and dust particle pick-up, as well as an increase in the abrasion resistance. Depending on the settings (e.g., acceleration voltage and/or duration) of the treatment (e.g., conventional e-beam radiation cross-linking techniques) used to further cross-link the already cross-linked silicone elastomeric material, there may be a remaining portion of the structured surface, or at least of the structured film substrate that does not exhibit the higher silicone elastomer cross-link density. Alternatively, the structured surface may be entirely cross-linked to about the higher silicone elastomer cross-link density. To save on energy costs, it can be desirable to minimize the depth and degree to which the structured surface is further cross-linked to a higher silicone elastomer cross-link density. Irradiation with low electron beam acceleration voltages (100-150 kv) typically limits cross-linking too close to the surface of the silicone elastomer. Referring to FIG. 6, exemplary transparent structured surface film described herein 60 comprises structured film substrate 62 that has a major structured face 64 with structured surfaces (e.g., in the form of prismatic riblets 66). Each structured surface 66 has tip angle $\alpha$ and structured surface 68 that is exposed. Film 60 further comprises base portion 63 from which structured surfaces 66 extend. Base portion 63 can be an integrally formed part of structures 66 as illustrated, or a separate layer as indicated by dashed line 61. Structured film substrate 62 comprises a cross-linked silicone elastomeric material. The silicone elastomeric material is formed by electron beam irradiation of silicone fluid or gum. Structured face 64 is exposed to an additional cross-linking treatment (e.g., e-beam radiation or heat energy) such that each structured surface 68 has a silicone elastomer cross-link density that is higher than a core or otherwise remainder 62 of structured film substrate 62. The depth D of the higher cross-link density depends on the acceleration voltage and/or duration of the additional cross-linking treatment. The higher cross-link density of structured surface 68 results in an increased resistance to dirt and dust particle pick-up, as well as an increase in the abrasion resistance of silicone elastomer surface 68.

It can be desirable for film 60, or any other structured surface film described herein, to be used in combination with optional support backing 65. With such an embodiment, support backing 65 has primer layer 67 bonded to structured film substrate 62. Support backing 65 can comprise a polymeric material or an inorganic glass or other transparent ceramic material. Exemplary polymeric materials may include at least one or a combination of a polymethyl methacrylate (PMMA) film, polyvinylidene fluoride (PVDF) film, polyethylene terephthalate (PET) film, primed PET film, polycarbonate film, cross-linked polyurethane film, acrylate film, or fluorinated ethylene-propylene (FEP) film. The other transparent ceramic material may be, for example, quartz crystal. Transparent nonwoven or woven fiber materials, or chopped transparent fibers, may also be used to form support backing 65. Such fiber materials may also be disposed in the silicone elastomeric material forming structured film 60.

Transparent support backing 65 can also be chosen so as to dissipate static electricity. For example, the support backing can comprise one or more polymeric materials that enable support backing 65 to dissipate static electricity. In order to dissipate static electricity, transparent support backing 65 may also comprise an inherently static dissipative polymer (available, for example, under the trade designations "STATRITE X5091 POLYURETHANE" or "STATRITE M809 POLYMETHYL METHACRYLATE"

from Lubrizol Corp., Wickliffe, Ohio) Alternatively, static dissipative salts (available, for example, under the trade designation "FC4400" from 3M Company, St. Paul, Minn.) can be blended into the polymer used to make the transparent support backing 65 (e.g., PVDF). Support backing 65 can also be comprised of multiple layers.

Figure 7:
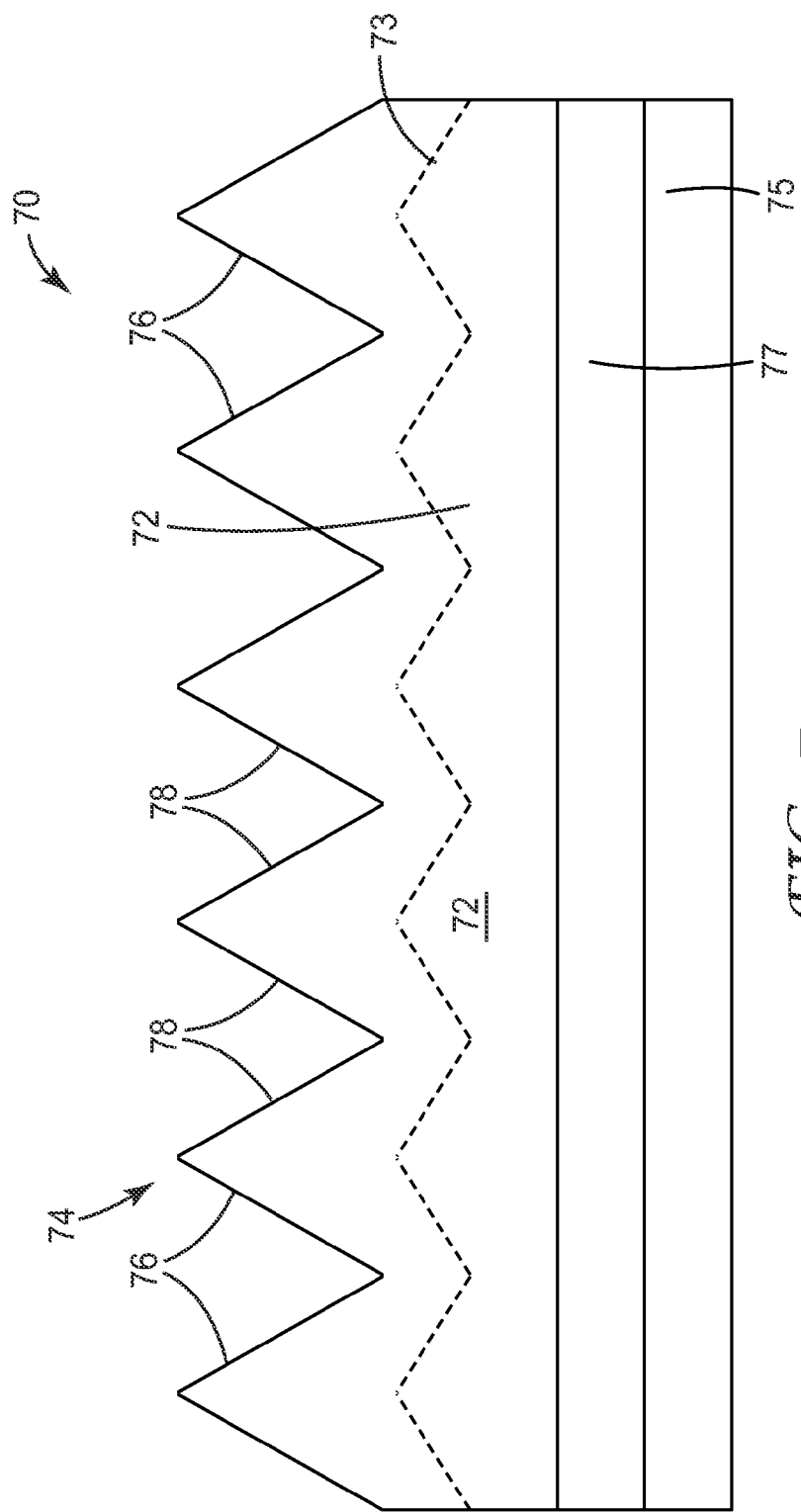

Referring to FIG. 7, in another exemplary embodiment of the structured surface film 70, major structured face 74 is exposed to additional cross-linking such that all of the silicone elastomeric material of each of structured surfaces 76 has a silicone elastomer cross-link density about as high as that of structured surface 78, with remainder 72 of film 70 having a lower silicone elastomer cross-link density than that of each of structured surfaces 76. Dashed line 73 separates the higher cross-link density portion of film 70 from the lower cross-link density portion. It can be desirable for film 70, or any other structured surface film according to the invention, to be used in combination with optional support backing 75. With such an embodiment, support backing 75 has primer layer 77 bonded to structured film substrate 75.

The present disclosure also provides an article comprising at least first and second layers (in some embodiments a third, or more layers) with at least one layer comprising a surface-structured, cross-linked silicone-based material described therein. In some embodiments, the layers each have a degree of cross-linking of the silicone-based material. For example, in one exemplary embodiments, first, second, and third layers each have a degree of cross-linking of the silicone-based material, wherein the degree of cross-linking of the silicone-based material for the first layer is greater than the degree of cross-linking of the silicone-based material for the second layer, and wherein the degree of cross-linking of the silicone-based material for the second layer is greater than the degree of cross-linking of the silicone-based material for the third layer. In some embodiments, each layer has a different composition. These articles can provide, for example, a highly cross-linked surface that is non-tacky (e.g., dirt pick-up resistant), on a top of a elastomeric middle layer, on top of a third to cross-linked layer that exhibits pressure sensitive adhesive-like properties.

Glass as part of a "silicone on glass" Fresnel lens can be used as a substrate herein. Fresnel lenses are lenses of large aperture and short focal length without the weight and volume of conventional lenses produced by breaking the lens into a set of concentric annular sections known as "Fresnel zones". Fresnel lenses are commonly used for concentrating sunlight onto solar photovoltaic or solar thermal modules although they have been and are used for many other applications. Fresnel lenses are often made out of polymethyl methacrylate (PMMA) and polycarbonate. "Silicone on glass" Fresnel lenses are more recent and comprise a structured silicone on glass. These Fresnel lenses offer the potential for increased durability and weatherability. The "silicone on glass" Fresnel lens may be improved by the following process. The glass may be primed on one side using the nano-silica solution described herein and optionally coated on the opposite sun side of the glass with nano-silica solution described herein to reduce reflection and improve light capture. The primer may be baked to improve adhesion. A blend of non-functional polydimethylsiloxane (PDMS) fluid and vinyl-functional PDMS fluid can be coated onto a Fresnel tooling surface so that the features are fully filled and a smooth PDMS blend surface results. The filled tooling can then be passed through an e-beam process which cross-links the PDMS fluid blend. A UV initiated, Pt catalyzed, addition cure silicone fluid tie layer such as described, for example, in Example 11, can optionally be applied in a very thin layer, to minimize cost, to the primed glass surface. This solution may be applied onto the glass with various techniques, such as roll coating, notch-bar coating, and screen-printing. The thickness of this layer can vary, although the cure dynamics are to be taken into account so that it does not cure prior to lamination but still cures quickly after lamination and UV exposure. Prior to curing of the silicone tie-layer, the silicone filled tooling film is laminated to the primed glass. This lamination step may involve a rolling bank of silicone to form at the lamination site. Registration of the tooling film pattern to the glass edges may need to be tightly controlled. The construction can then be irradiated with UV radiation from a standard H bulb or black light to initiate the silicone tie-layer cross-linking. In some embodiments, it may be desirable to heat or even partially cure the tie-layer prior to lamination to allow for a more rapid cure after exposure to the UV lamps. After the UV-curable silicone tie-layer is sufficiently cross-linked, the Fresnel tooling can be removed leaving the e-beam cross-linked silicone Fresnel adhered to the glass sheet.

In some embodiment, an e-beam cross-linked silicone Fresnel lens can be made directly onto a primed film without the use of a separate silicone tie-layer. For example, a poly dimethylsiloxane (PDMS) gum may be pressed between a polymethylmethacrylate (PMMA) Fresnel tool and sheet of polyethylene terephthalate (PET) primed with the nano-silica solution described herein. This construction may be passed through an e-beam process so that the radiation passes first through the PET surface. After the silicone gum is sufficiently cross-linked by the e-beam the PMMA tool may be removed leaving the e-beam cross-linked silicone Fresnel lens attached to the primed PET surface.

Exemplary Embodiments

1. A method of making a surface-structured, cross-linked silicone-based material, the method comprising:
providing a surface-structured composition comprising silicone-based material, wherein the composition is substantially free of catalysts and initiators;
exposing the surface-structured composition to an electron-beam to cross-link the silicone-based material to provide the surface-structured, cross-linked silicone-based material.
2. The method of embodiment 1, wherein the silicone-based material of the composition is a nonfunctionalized silicone.
3. The method of either embodiment 1 or 2, wherein the silicone-based material of the composition comprises a siloxane backbone and at least one functional group.
4. The method of embodiment 3, wherein all functional groups are hydroxyl groups.
5. The method of any preceding embodiment, wherein the silicone-based material of the composition is a polysiloxane.
6. The method of embodiment 5, wherein the polysiloxane is a poly(dimethylsiloxane).
7. The method of embodiment 5, wherein the polysiloxane is an aromatic siloxane.
8. The method of any preceding embodiment, wherein the silicone-based material of the composition comprises a silicone fluid having a dynamic viscosity at 25° C. of no greater than 1,000,000 mPa·sec.
9. The method of any preceding embodiment, wherein the silicone-based material of the composition comprises a gum having a dynamic viscosity at 25° C. of greater than 1,000,000 mPa·sec.

10. The method of any preceding embodiment, wherein the composition further comprises an MQ resin tackifier.

11. The method of any preceding embodiment, wherein the composition further comprises at least one of glass bubbles, polymeric microspheres, nanoparticles, fumed silica, fused silica, quartz powder, glass bubbles, milled glass fibers, nanoparticles, polymer beads, carbon, diatomaceous earth, clay, carbon nano-tubes, carbon black, metal oxides such as iron oxide, titanium oxide, cerium oxide, metal carbonates, pigments, UV absorbers, dyes or antioxidants.

12. The method of any preceding embodiment, further comprising:
   providing replication tool having a major surface of at least one of nano-sized or micro-sized surface structures, and
   applying the composition comprising the silicone-based material that is substantially free of catalysts and initiators onto at least a portion of the major surface of the replication tool to form the surface-structured composition comprising silicone-based material that is substantially free of catalysts and initiators.

13. The method of any of embodiments 1 to 11, further comprising:
   providing a substrate having a first major surface;
   coating the composition comprising the silicone-based material that is substantially free of catalysts and initiators on at least a portion of the major surface of the substrate; and
   contacting the coated composition with a major surface of a replication tool having at least one of nano-sized or micro-sized surface structures on the major surface to form the surface-structured composition comprising silicone-based material that is substantially free of catalysts and initiators.

14. The method of embodiment 13, further comprising:
   applying a primer coating composition onto at least a portion of the major surface of the substrate before coating the composition comprising the silicone-based material that is substantially free of catalysts and initiators thereon.

15. A surface-structured, cross-linked silicone-based material prepared according to any of embodiments 1 to 14.

16. The surface-structured, cross-linked silicone-based material of embodiment 15, wherein the surface structures comprise micro-sized structures.

17. The surface-structured, cross-linked silicone-based material of either embodiment 15 or 16, wherein the surface structures comprise nano-sized structures.

18. The surface-structured, cross-linked silicone-based material of embodiment 15, wherein the surface structures consist of micro-sized structures.

19. The surface-structured, cross-linked silicone-based material of embodiment 15, wherein the surface structures consist of nano-sized structures.

20. The surface-structured, cross-linked silicone-based material of any of embodiments 15 to 19 having two generally opposed major surfaces with the structures on each of said major surfaces.

21. The surface-structured, cross-linked silicone-based material of embodiment 15 which is part of a Fresnel lens.

22. An article having two generally opposed major surfaces with a first surface-structured, cross-linked silicone-based material on one major surface and a second surface-structured, cross-linked silicone-based material on the generally opposed major surface, wherein the first and surface-structured, cross-linked silicone-based materials are prepared according to the method of any of embodiments 1 to 21, wherein the first surface-structured, cross-linked silicone-based material has a first cross link density and the second surface-structured, cross-linked silicone-based materials has a second cross link density on the generally opposed major surface, wherein the first cross-link density is greater than the second cross-link density.

23. An article comprising a substrate having a major surface with the surface-structured silicone-based material prepared according to the method of any of embodiments 1 to 14 on at least a portion of the first major surface.

24. The article according to embodiment 23, wherein there is a primer between the major surface and the silicone-based material.

25. The article according to embodiment 24, where the primer is nanoparticle-containing primer comprising agglomerates of silica nanoparticles having average particle diameters of up to 40 nanometers, the agglomerates comprising a three-dimensional porous network of silica nanoparticles, and the silica nanoparticles are bonded to adjacent silica nanoparticles.

26. An article comprising a substrate having a first and second, generally major surfaces with a first surface-structured silicone-based material on at least a portion of the first major surface, and a second surface-structured silicone-based material on at least a portion of the second major surface, wherein the surface-structured silicone-based materials are prepared according to the method of any of embodiments 1 to 14.

27. The article according to embodiment 26, wherein there is a first primer between the first major surface and the first silicone-based material.

28. The article according to embodiment 26, wherein there is a silicone tie layer between the first major surface and the first silicone-based material.

29. The article according to either embodiment 27 or embodiment 28, where the first primer is nanoparticle-containing primer comprising agglomerates of silica nanoparticles having average particle diameters of up to 40 nanometers, the agglomerates comprising a three-dimensional porous network of silica nanoparticles, and the silica nanoparticles are bonded to adjacent silica nanoparticles.

30. The article of any of embodiments 26 to 29, wherein the substrate is at least one of a polymeric film, a polymeric sheet, a molded polymeric part, a metal, paper, UV mirror, a UV stable substrate, a glass substrate, a portion of a car, a portion of a plane, a portion of a train, a wind turbine blade, a solar voltaic module, a solar thermal panel, a boat hull, a mirror, a display, a traffic sign, a window, a reinforcing scrim, a release liner, or a photo bio reactor liner.

31. The article according to embodiment 26, wherein there is a first primer between the first major surface and the first silicone-based material and a second primer between the second major surface and the second silicone-based material.

32. The article according to embodiment 30, wherein the first and second primers are nanoparticle-containing primers comprising agglomerates of silica nanoparticles having average particle diameters of up to 40 nanometers, the agglomerates comprising a three-dimensional porous network of silica nanoparticles, and the silica nanoparticles are bonded to adjacent silica nanoparticles.

33. The article of any of embodiments 30 to 32, wherein the substrate is at least one of a polymeric film, a polymeric sheet, a molded polymeric part, a metal, paper, UV mirror, a UV stable substrate, a glass substrate, a portion of a car, a portion of a plane, a portion of a train, a wind turbine blade, a solar voltaic module, a solar thermal panel, a boat hull, a mirror, a display, a traffic sign, a window, a reinforcing scrim, a release liner, or a photo bio reactor liner.

34. An article comprising first and second layers each independently comprising a surface-structured, cross-linked silicone-based material prepared according to the method of any of embodiments 1 to 14.

35. The article of embodiment 34, wherein each layer has a different composition.

36. An article comprising first, second, and third layers each independently comprising a surface-structured, cross-linked silicone-based material prepared according to the method of any of embodiments 1 to 14.

37. The article of embodiment 36, wherein first, second, and third layers each have a degree of cross-linking of the silicone-based material, wherein the degree of cross-linking of the silicone-based material for the first layer is greater than the degree of cross-linking of the silicone-based material for the second layer, and wherein the degree of cross-linking of the silicone-based material for the second layer is greater than the degree of cross-linking of the silicone-based material for the third layer.

38. The article of any of either embodiment 36 or 37, wherein each layer has a different composition.

39. A surface-structured, cross-linked silicone-based material prepared according to the method of any of embodiments 1 to 14, wherein the cross-linked silicone-based material is a silicone pressure sensitive adhesive.

40. An adhesive article comprising a substrate having a first major surface, and the silicone pressure sensitive adhesive according embodiment 39 adhered to at least a portion of the first major surface of the substrate.

41. The adhesive article of embodiment 40, wherein the cross-linked material is non-tacky.

42. The adhesive article of either embodiment 40 or 41, wherein the substrate comprises a foam.

43. The adhesive article of any of embodiments 40 to 42, wherein the substrate comprises at least one of a polymeric film, a polymeric sheet, a molded polymeric part, a metal such as aluminum or stainless steel, an ultraviolet mirror, infrared mirror, a UV stable substrate, a glass substrate, a portion of a car, a portion of a plane, a portion of a train, a wind turbine blade, a solar photovoltaic module, a solar thermal panel, a boat hull, a mirror, a traffic sign, a display, a window, a reinforcing scrim, a textile, a release liner, a transdermal skin patch, or a photo bio reactor liner.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

A microstructured urethane acrylate tool film was made using a formulation consisting of 55.3% by weight aliphatic urethane acrylate (obtained under the trade designation "CN991" from Sartomer USA, Exton, Pa.), 31.6% by weight polyester acrylate oligomer (obtained under the trade designation "CN2303" from Sartomer USA), 10% by weight tetrahydrofuryl acrylate (obtained under the trade designation "SR285" from Sartomer USA), 5% by weight acrylate functional polyhedral oligomeric silsesquioxane (obtained under the trade designation "ACRYLO POSS" from Hybrid Plastics, Inc., Hattiesburg, Miss.), 2% by weight hydroxyphenyl benzotriazole UV absorber (obtained under the trade designation "TINUVIN 928" from Ciba Specialty Chemicals, Inc., Tarrytown, N.Y.), 2% by weight hindered amine light stabilizer (obtained under the trade designation "TINUVIN 152" from Ciba Specialty Chemicals, Inc.), and 2% by weight photoinitiator (obtained under the trade designation "LUCIRIN TPO-L" from BASF, Ludwigshafen, Germany). The urethane acrylate was coated on to 35.6 cm (14 inch) wide pre-primed polyethylene terephthalate (PET) (obtained under the trade designation "MELINEX 618" from DuPont Teijin Films, Chester, Va.). The urethane acrylate was UV cured through the PET film while in contact with a machined metal roll with prismatic grooves with a 24 micrometer pitch and 90 degree tip angle. The resulting PET film with urethane acrylate structured surface was wound on to a roll. The silicone fluid used was a silanol terminated polydimethylsiloxane with a kinematic viscosity of 18,000 centistokes (obtained under the trade designation "DMS-542" from Gelest, Inc, Morrisville, Pa.). The substrate film was a 33 cm (13 inch) wide, 25 micrometer thick PET (available under the trade designation "MYLAR Polyester from DuPont Teijin Films, Chester, Va.)) primed with a 2 micrometer wet coating of solvent-borne silicone primer (obtained under the trade designation "SS4120" from Momentive Performance Materials, Inc., Waterford, N.Y.) and then dried at 71° C. (160° F.)-93° C. (200° F.).

The silicone fluid was applied to the solvent-borne silicone primer ("SS4120") primed PET substrate using a 25.4 cm (10 inch) wide coating die and a gear pump (obtained from Zenith Pumps, Monroe, N.C.; Model #6152789-003) prior to entering a nip roll station. The urethane acrylate tooling film was introduced at the nip station, where the structured surface of the tooling film was brought into intimate contact with the silicone fluid. The film construction passed into an electron beam irradiation unit where the construction received a dose of 30 MRad at an acceleration voltage of 200 keV and a line speed of 15.2 m/min (50 feet/min). The electron beam unit was a broadband curtain type electron beam processor (obtained from Energy Sciences, Inc., Wilmington Mass.). After exiting the electron beam unit the film construction was wound on a roll. At this point the silicone fluid was cross-linked and retains the shape it held while passing through the electron beam unit. The urethane acrylate tooling film was pulled away leaving a reverse image formed in the silicone attached to the solvent-borne silicone primer ("SS4120") primed PET substrate.

Digital microscope analysis showed that the silicone prism structures had a tip angle of 90.56 degrees which indicates excellent replication of the tooling film which had 90 degree tip and valley angle.

Example 2

A microstructured polypropylene film was made using an extrusion replication process. Polypropylene (obtained under the trade designation "FINA 7825" from Total Petrochemicals USA, Inc. Houston, Tex.) was extruded through a film extrusion die into a nip roll casting station consisting of one rubber roll and a machined roll with linear prismatic grooves having 54 degree peaks and valley with a 50 micrometer pitch. The polypropylene extrudate film quenches while against the machined roll forming a linear prism surfaced film, which was then wound into a roll.

A roll of 30.5 cm (12 inch) wide PET film was primed with an adhesion promoting nano-silica primer. The nanosilica primer consists of a 5% by weight blend of a 70:30 weight ratio of a first colloidal silica (obtained under the trade designation "NALCO 1115 COLLOIDAL SILICA" from Nalco Chemical Company, Naperville, Ill.) and a second colloidal silica (obtained under the trade designation "NALCO 1050 COLLOIDAL SILICA" from Nalco Chemical Company) in $H_2O$, brought to a pH of 2.5-2.0 with $HNO_3$. The primer was coated onto the PET film at a thickness of about 100 nanometers, run through an oven at 21° C. (70° F.)-107° C. (225° F.) and then wound on a roll.

A non-functional silicone gum (obtained under the trade designation "EL POLYMER NA" available from Wacker Chemical Corp, Adrian, Mich.) was extruded from a 15.2 cm (6 inch) wide film extrusion die at 191° C. (375° F.) using a 5.1 cm (2 inch) diameter extruder (obtained under the trade designation "BONNOT EXTRUDER" from The Bonnot Company, Uniontown, Ohio). The gum was extruded directly into a nip roll casting station consisting of a metal chill roll and a rubber roll. Both the polypropylene tooling film and the nano-silica primed PET film were introduced into the nip while the silicone gum was extruded between them so that the polypropylene tooling film structures made intimate contact with the top surface of the extruded silicone gum and the nano-silica primed surface of the PET film was in intimate contact with the bottom surface of the extruded silicone gum. This film construction was then wound in to a roll. Sections of the film constructions 0.9 meter (3 feet) long were unwound and taped onto a carrier web that passed through an electron beam at an acceleration voltage of 300 keV and a dose of 3 MRads. The electron beam unit was a broadband curtain type electron beam processor (obtained from PCT Engineered Systems, LLC, Davenport, Iowa). After irradiation, the polypropylene tooling film was removed leaving the reverse image in the surface of the cross-linked silicone film attached to the nano-silica primed PET film.

The silicone and tooling films were analyzed using a digital microscope which showed excellent replication of the tooling film surface in the cross-linked silicone gum film.

Example 3

Prophetic

A microstructured silicone film on a flexible substrate could be made using a structured metal tool roll within an electron beam unit.

A metal conductive chill roll within an electron beam unit could be replaced with a chill roll whose surface was machined to a specific pattern. A nano-silica primed PET film could be coated with a silicone fluid so that as it passes into the electron beam the coated silicone surface makes intimate contact with the machined chill roll. While the silicone is in contact with the machined chill roll the electron radiation would penetrate the PET substrate and the silicone resulting in a cross-linked silicone film that would release from the machined tool roll when it reaches a strip-off roll after the irradiation zone. After the silicone film is stripped from the machined tool roll it would pass out of the electron beam unit where it would be wound in to a roll, retaining microstructured surface.

Example 4

Prophetic

A microstructured silicone film on a flexible substrate could be made using a structured metal belt tool passing through an electron beam unit.

A metal belt with a surface machined to a specific pattern could be designed to pass through an electron beam unit. A nip roll could be designed to contact the belt tool on the inlet side of the electron beam unit allowing extrusion directly into the nip and also a point to introduce a primed substrate film. Silicone gum could be extruded from a film extrusion die directly into the nip formed between the nip roll and the metal belt tool. A primed film substrate could be introduced in the nip as well. While the silicone is in contact with the machined belt tool, the electron radiation would penetrate the film substrate and the silicone resulting in a cross-linked silicone film that would release from the machined belt tool when it reaches a strip-off roll after the irradiation zone outside of the electron beam unit. After the silicone film is stripped from the machined belt tool it would be wound in to a roll, retaining microstructured surface.

Example 5

A microstructured silicone surface was formed on a rigid glass substrate using a structured polypropylene film as a tool, a non-functional polydimethylsiloxane gum and a nano-silica primed glass substrate.

The microstructured polypropylene film was made using an extrusion replication process. Polypropylene ("FINA 7825") was extruded through a film extrusion die into a nip roll casting station consisting of one rubber roll and a second machined roll with linear prismatic grooves having 54 degree peaks and valley with a 50 micrometer pitch. The polypropylene extrudate quenches while against the machined roll forming a liner prism surfaced film, which was then wound into a roll. The nano-silica primer consists of a 5% by weight blend of a 70:30 ratio of a first colloidal silica ("NALCO 1115 COLLOIDAL SILICA") and a second colloidal silica ("NALCO 1050 colloidal SILICA") in $H_2O$, brought to a pH of 2.5-2.0 with $HNO_3$. A thin (about 100 nanometers) even coating of the primer was applied to a 7.6 cm (3 inch) by 5.1 cm (2 inch) glass slide by wiping the surface with a small wipe (obtained under the trade designation "KIMTECH" from Kimberly-Clark, Roswell, Ga.) dampened with the nano-silica primer solution. The primer was allowed to dry at room temperature.

A 0.5 gram portion of a non-functional silicone gum ("EL POLYMER NA") was weighed and formed into a round ball. The ball of silicone gum was placed on the primed surface of the glass slide. A 7.6 cm (3 inch) by 5.1 cm (2 inch) piece of the polypropylene tooling film was placed on top of the silicone ball with the tooling film surface structure pressing into the silicone gum. The silicone gum was pressed to a thickness of 75 micrometer between the polypropylene tooling film and the primed glass slide using an unheated platen press using a pressure of 27.6 MPa (4000 psi). The glass slide, silicone and tooling film construction was taped to a carrier web and passed through an electron beam at an acceleration voltage of 300 keV and a dose of 3 MRads. The E-beam unit was a broadband curtain type electron beam processor (obtained from PCT Engineered Systems, LLC). After irradiation, the polypropylene tooling film was removed leaving the reverse image in the surface of the cross-linked silicone attached to the nano-silica primed glass. During the irradiation color centers develop within the glass matrix resulting in a brown tint within the glass. After irradiation, the silicone coated glass slide was placed in a 250° C. oven for 3 hours to remove the majority of the color returning the glass to the original clear state.

The silicone and tooling films were analyzed using a digital microscope which showed excellent replication of the tooling film surface in the cross-linked silicone gum.

Example 6

Prophetic

A microstructured silicone pressure sensitive adhesive (PSA) film could be made by using a microstructured release liner and a silicone formulation containing an MQ tackifier resin and a primed backing film.

The microstructured release liner could be made by using an extrusion replication process followed by a plasma fluorine deposition process to apply a thin release layer on the surface. Polypropylene (e.g., "FINA 7825") could be extruded through a film extrusion die into a nip roll casting station consisting of one rubber roll and a machined roll with linear prismatic grooves having 54 degree peaks and valleys with a 50 micrometer pitch. The polypropylene extrudate film quenches while against the machined roll forming a prism surfaced liner film, which could then wound into a roll. The surface-structured polypropylene liner could then pass through a plasma fluorination process to apply a thin release surface on the structured liner. A non-functional silicone gum (e.g., "EL POLYMER NA") could be blended with 10-60% MQ tackifier resin (available, for example, under the trade designation SQO-299 from Gelest, Inc., Morrisville, Pa.) to make a PSA formulation. The nano-silica primer consists of a 5% by weight blend of a 70:30 ratio of a first colloidal silica ("NALCO 1115 COLLOIDAL SILICA") and a second colloidal silica ("NALCO 1050 COLLOIDAL SILICA") in $H_2O$, brought to a pH of 2.5-2.0 with $HNO_3$. The primer can be coated (e.g., at a thickness of about 100 nanometers) onto an adhesive backing material of choice.

The PSA formulation could be extruded from a film extrusion die using an extruder ("BONNOT EXTRUDER"). The PSA could be extruded directly into a nip roll casting station consisting of a metal chill roll and a rubber roll. Both the fluorinated structured release liner and the nano-silica primed backing film could be introduced into the nip while the PSA film is extruded between them so that the release liner structures make intimate contact with the top surface of the extruded PSA and the nano-silica primed surface of the backing film makes intimate contact with the bottom surface of the extruded PSA. This film construction could then be passed through an electron beam at an acceleration voltage of 300 keV and a dose of 3 to 6 MRads. After irradiation, the structured fluorinated polypropylene release liner could be removed leaving the reverse image in the surface of the cross-linked silicone PSA film attached to the nano-silica primed backing film. The grooves will allow air to bleed along the channels and allow bubble free application of the silicone PSA film.

Example 7

Prophetic

Any of the methods according, for example, to Examples 1-4 could be used to make a microstructured silicone film that could be used as a release liner for making structured PSAs.

The microstructured silicone films described in Examples 1-4 could substitute for the structured release liners described, for example, in U.S. Pat. No. 3,301,741 (Henrickson et al.) which reports using a microstructured film coated with a thin layer of release material for a release liner and then coating that film with a PSA formulation so that when the PSA is cross-linked it holds the microstructure when the release liner is removed. A variety of functional PSAs can be created depending on the pattern of original release liner such as air-bleed PSAs for bubble-free application.

Example 8

Prophetic

For any of Example 1-7, where after formation of the surface-structured cross-linked silicone, the surface-structured cross-linked silicone can be irradiated with low voltage electron beam (100-150 kv) with a dosage of at least 20 megarads (more preferably, at least 30 megarads), to create higher cross-link density at the surface of the surface-structured cross-linked silicone.

Example 9

Prophetic

Surface-structured cross-linked silicone as described in Example 8 is coated onto a UV mirror and then applied to a photovoltaic module.

A UV reflective multilayer optical film can be made with first optical layers of a polyethylene terephthalate (PET) (PET1; available from DuPont, Wilmington, Del.) and second optical layers of co-polymethyl (meth)acrylate (PMMA) (coPMMA1; available from Plaskolite, Inc., Columbus, Ohio). The PET1 and coPMMA1 can be coextruded through a multilayer polymer melt manifold to form a stack of 224 optical layers. The layer thickness profile (layer thickness values) of this UV reflector can be adjusted to be approximately a linear profile with the first (thinnest) optical layers adjusted to have about a ¼ wave optical thickness (index times physical thickness) for 300 nm light and progressing to the thickest layers which can be adjusted to be about ¼ wave thick optical thickness for 400 nm light. Layer thickness profiles of such films can be adjusted to provide for improved spectral characteristics using the axial rod apparatus disclosed in U.S. Pat. No. 6,783,349 (Neavin et al.), combined with layer profile information obtainable by atomic force microscopic techniques. 20 wt % of UV absorber masterbatch (e.g., available under the trade designation "SUKANO TA07-07 MB" from Sukano Polymers Corp, Duncan, S.C.) can be extrusion compounded into both the first optical layers (PET1).

In addition to these optical layers, non-optical protective skin layers, made by blending 35 wt % polyvinylidene (PVDF) (available under the trade designation "PVDF1008" from 3M Company) with 65 wt % PMMA (available under the trade designation "CP82" from Plaskolite, Inc.), having a thickness of 260 micrometers each can be coextruded on either side of the optical stack. 20 wt % of UV absorber masterbatch (e.g., "SUKANO TA11-10 MB01") can be compounded into these PVDF/PMMA blend protective skin layers in place of the PMMA portion. This multilayer coextruded melt stream can be cast onto a chilled roll at 5.4 meters per minute creating a multilayer cast web approximately 500 micrometers (20 mils) thick. The multilayer cast web can then be preheated for about 10 seconds at 95° C. and biaxially oriented at a draw ratios of 3.5×3.7. The oriented multilayer film can be further heated at 225° C. for 10 seconds to increase crystallinity of the PET layers.

When applied to a photovoltaic module, this UV stable surface-structured cross-linked silicone film is expected to increase power output by 4.5%.

Example 10

A "silicone on glass" Fresnel lens was made comprising an e-beam cured silicone.

Low iron glass panels were cleaned with cleaner (obtained under the trade designation "ALCONOX" from Alconox, White Plains, N.Y.) and stored in deionized water. The cleaned glass was removed from the water bath and dried with a stream of compressed air. A nano-silica primer was applied to a major surface of the clean glass. The aqueous nano-silica primer contained a 5% by weight blend in water of a 70:30 weight ratio of a first colloidal silica (obtained under the trade designation "NALCO 1115 COLLOIDAL SILICA" from Nalco Chemical Company, Naperville, Ill.) and a second colloidal silica (obtained under the trade designation "NALCO 1050 COLLOIDAL SILICA" from Nalco Chemical Company), brought to a pH of 2.0 with $HNO_3$. The nano-silica primer was applied to a major surface of the glass panel by wiping the surface with a small wipe (obtained under the trade designation "KIMTECH" from Kimberley Clark, Irving, Tex.) dampened with the nano-silica primer solution. The primer was applied at a dry thickness of about 100 nanometers. The primer was allowed to dry at room temperature.

A silicone blend was made containing 50 wt. % non-functional polydimethylsiloxane (PDMS) fluid (obtained under the trade designation "DMS-T43" from Gelest, Morrisville, Pa.) and 50 weight % of vinyl terminated silicone fluid (obtained under the trade designation "DMS-V42" from Gelest). The silicone blend was then coated into a microreplicated daylighting film (obtained under the trade designation "DLRP0022" from 3M Company, St. Paul, Minn.) using a notch bar coater set with a gap so that the tooling features were filled and a planar top surface resulted. The coated tooling film was passed open face through an e-beam process where it received a dose of 16 MRad through two passes at 8 MRad/pass at an acceleration voltage of 300 keV which fully cross-linked the silicone.

The resulting construction was laminated to the primed glass using a thin layer of a clear thermal-cure silicone elastomer (obtained under the trade designation "SYLGARD 184" from Dow Corning Corporation, Midland, Mich.). The thermal-cure silicone elastomer ("SYLGARD 184") was cured at 100° C. for one hour. After the silicone elastomer ("SYLGARD 184")-layer was cured, the tooling film was removed leaving the e-beam cured Fresnel structured silicone attached to the glass with the silicone elastomer ("SYLGARD 184") tie-layer.

Example 11

Another "silicone on glass" Fresnel lens was made that included a "photocured silicone tie layer".

A silicone blend was made containing 95 wt. % non-functional polydimethylsiloxane fluid (obtained under the trade designation "DMS-T41.2" from Gelest) and 5 weight % of vinyl terminated silicone fluid (obtained under the trade designation "DMS-V41" from Gelest). The silicone blend was then coated into a microreplicated daylighting film ("DLRP0022"). The coated tooling film was passed open face through an e-beam process where it received a dose of 20 MRad through two passes at 10 MRad/pass at an acceleration voltage of 300 keV which fully cross-linked the silicone.

A two-part photocurable silicone was prepared as follows. The two-part mixture was formulated to be mixed in a 1:1 ratio of Part A to Part B to make the photocurable silicone.

Part A was prepared as follows. To a 22.7 liter (5 gallon) polyethylene pail (obtained from Consolidated Container Co. Ltd., Minneapolis, Minn.) was added 9.7 kg of a mixture of about 25% by weight vinyl MQ resin in a vinyl terminated polydimethylsiloxane polymer (obtained under the trade designation "VQM-135" from Gelest, Inc.), 5.23 kg of a vinyl terminated polydimethylsiloxane polymer (obtained under the trade designation "DMS-V22" from Gelest, Inc., Morrisville, Pa.), and 0.98 gram of trimethyl(methylcyclopentadienyl)platinum IV dissolved in 2 mL heptane (catalyst obtained from Strem Chemical Inc, Newburyport, Mass.). The resulting mixture was stirred using an overhead stirrer for 30 minutes until the mixture was homogeneous. The platinum catalyst concentration was designed to be 20 ppm platinum for the 2-part mixed formulation.

Part B was prepared as follows. To a 22.7 liter (5 gallon) polyethylene pail was added 9.7 kg of a mixture of about 25% by weight vinyl MQ resin in a vinyl terminated polydimethylsiloxane polymer ("VQM-135"), 6.4 kg of a vinyl terminated polydimethylsiloxane polymer ("DMS-V22"), and 1.39 kg of a silicon hydride containing cross-linker (obtained under the trade designation "DOW CORNING SYL-OFF 7678 Crosslinker" (Lot#0002623315 from Dow Corning Corporation). The resulting mixture was stirred using an overhead stirrer for 30 minutes until the mixture was homogeneous.

The "photocurable silicone tie layer" was coated onto a major surface of the glass prepared with the silica nanoparticle coating as described in Example 10. The filled tooling film was then laminated to the primed glass and partially cured via exposure to 350 nm UV lamps for 3 minutes through the glass side of the construction. The sample was then fully cured in an oven at 80° C. for 10 minutes. After the thermal cure step the tooling film was removed leaving the e-beam cured Fresnel structured silicone attached to the glass with the photocurable silicone tie-layer.

Various modifications and alterations of this invention will become apparent to those skilled in the art without departing from the scope and spirit of this invention.

What is claimed is:

1. A method of making a surface-structured, cross-linked silicone-based material, the method comprising:
   providing a surface-structured silicone-based material, wherein the surface-structured material is substantially free of catalysts and initiators; and
   exposing the surface-structured silicone-based material to an electron-beam to cross-link the silicone-based material, the cross-linked silicone-based material comprising a silicone pressure sensitive adhesive having a non-tacky structured surface, wherein the structured surface has peak to valley measurements of less than 250 micrometers.

2. The method of claim 1, wherein the silicone-based material is a nonfunctionalized silicone.

3. The method claim 2, wherein the silicone-based material is a polysiloxane.

4. The method of claim 2, further comprising:
   providing a replication tool having a major surface having at least one of nano-sized or micro-sized surface structures, and applying the silicone-based material that is substantially free of the catalysts and initiators onto at least a portion of the major surface of the replication tool to form the surface-structured silicone-based material that is substantially free of the catalysts and initiators.

5. The method of claim 2, further comprising:
providing a substrate having a first major surface;
coating the silicone-based material that is substantially free of the catalysts and initiators on at least a portion of the major surface of the substrate; and
contacting the coated composition with a major surface of a replication tool having at least one of nano-sized or micro-sized surface structures on the major surface to form the surface-structured silicone-based material that is substantially free of the catalysts and initiators.

6. The method of claim 5, further comprising:
applying a primer coating composition onto at least a portion of the major surface of the substrate before coating the silicone-based material that is substantially free of the catalysts and initiators thereon.

7. The method of claim 1, wherein the silicone-based material comprises a siloxane backbone and at least one functional group.

8. The method of claim 7, wherein all functional groups are hydroxyl groups.

9. The method of claim 1, wherein the silicone-based material is a polysiloxane.

10. The method of claim 1, further comprising:
providing a replication tool having a major surface having at least one of nano-sized or micro-sized surface structures, and
applying the silicone-based material that is substantially free of the catalysts and initiators onto at least a portion of the major surface of the replication tool to form the surface-structured silicone-based material that is substantially free of the catalysts and initiators.

11. The method of claim 1, further comprising:
providing a substrate having a first major surface;
coating the silicone-based material that is substantially free of the catalysts and initiators on at least a portion of the major surface of the substrate; and
contacting the coated composition with a major surface of a replication tool having at least one of nano-sized or micro-sized surface structures on the major surface to form the surface-structured silicone-based material that is substantially free of the catalysts and initiators.

12. The method of claim 11, further comprising:
applying a primer coating composition onto at least a portion of the major surface of the substrate before coating the silicone-based material that is substantially free of the catalysts and initiators thereon.

13. The method of claim 1, wherein the surface-structured, cross-linked silicone-based material has two generally opposed major surfaces with a first cross link density on one major surface and a cross link density on the generally opposed major surface, wherein the first cross-link density is greater than the second cross-link density.

14. The method of claim 13, further comprising exposing the cross-linked surface-structured silicone-based material to a second pass of the electron-beam.

15. The method of claim 1, wherein the surface-structured, cross-linked silicone-based material comprises a base portion integrally formed with the structured surface.

16. A method of making a release liner, the method comprising:
providing a surface-structured composition comprising silicone-based material on a substrate, wherein the composition is substantially free of catalysts and initiators;
exposing the surface-structured composition to an electron-beam to cross-link the silicone-based material to provide a release liner with a surface-structured, cross-linked silicone-based material, wherein the surface-structured, cross-linked silicone-based material comprises a structured surface having peak to valley measurements of less than 250 micrometers.

17. The method of claim 16, wherein the silicone-based material is a nonfunctionalized silicone.

18. The method of claim 17, wherein the silicone-based material comprises a siloxane backbone and at least one functional group.

19. The method of claim 18, wherein all functional groups are hydroxyl groups.

20. The method of claim 16, wherein the silicone-based material a polysiloxane.

* * * * *

UNITED STATES PATENT AND TRADEMARK OFFICE
CERTIFICATE OF CORRECTION

PATENT NO. : 9,896,557 B2
APPLICATION NO. : 13/642355
DATED : February 20, 2018
INVENTOR(S) : Todd G. Pett et al.

It is certified that error appears in the above-identified patent and that said Letters Patent is hereby corrected as shown below:

In the Specification

Column 5,
Line 51, delete ""TOH"" and insert -- "$T^{OH}$" --, therefor.

Column 9,
Line 65, delete "5P30,"" and insert -- SP30," --, therefor.

Column 11,
Lines 16-23, delete "Alternatively, the surface tension of the coating composition may be decreased by addition of lower alcohols ($C_1$ to $C_8$). In some instances, however, in order to improve the coating hydrophilicity for desired properties and to ensure uniform coating of the article from an aqueous or hydroalcoholic solution, it may be beneficial to add a wetting agent, which is typically a surfactant, to the primer composition." and insert the same on Column 11, Line 17 as a new paragraph.

Column 20,
Line 19, delete ""DMS-542"" and insert -- "DMS-S42" --, therefor.

Signed and Sealed this
Twenty-second Day of May, 2018

Andrei Iancu
*Director of the United States Patent and Trademark Office*